Aug. 6, 1963 R. H. EICHORN ETAL 3,099,944
XEROGRAPHIC CONTROL APPARATUS
Filed Dec. 28, 1961 27 Sheets-Sheet 1

INVENTOR.
ROGER H. EICHORN
ROBERT F. OSBORNE
BY
ATTORNEY

INVENTOR.
ROGER H. EICHORN
ROBERT F. OSBORNE

ATTORNEY

INVENTOR.
ROGER H. EICHORN
ROBERT F. OSBORNE

Aug. 6, 1963   R. H. EICHORN ETAL   3,099,944
XEROGRAPHIC CONTROL APPARATUS

Filed Dec. 28, 1961   27 Sheets-Sheet 10

INVENTOR.
ROGER H. EICHORN
ROBERT F. OSBORNE
BY
ATTORNEY

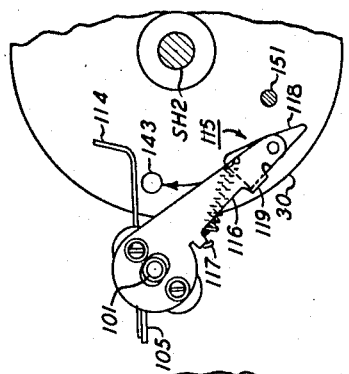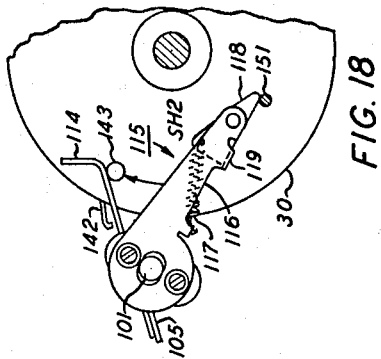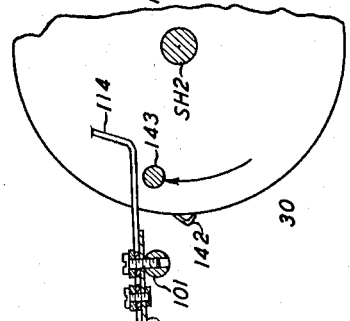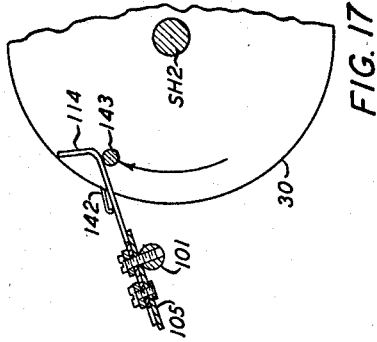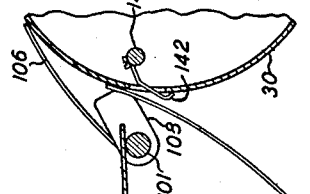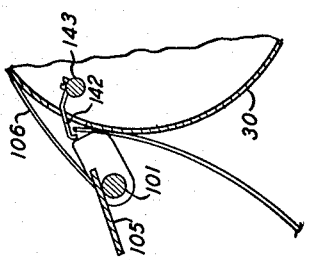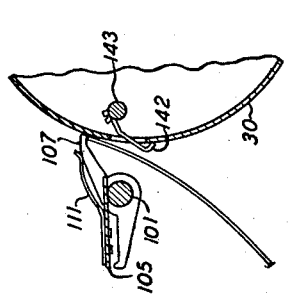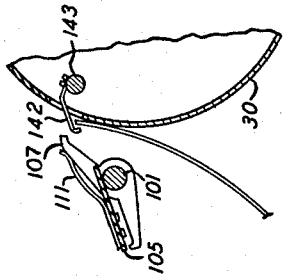

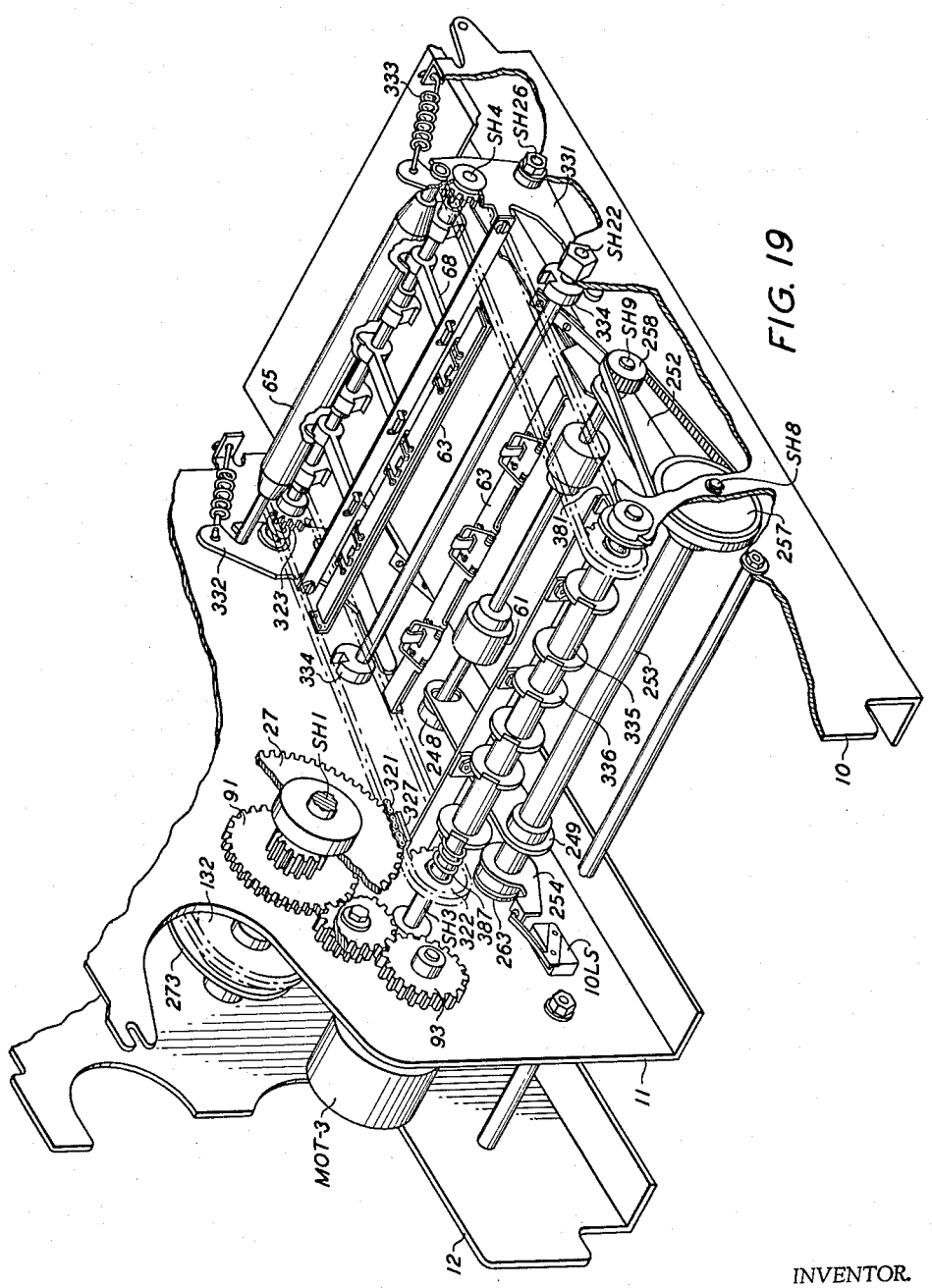

INVENTOR.
ROGER H. EICHORN
ROBERT F. OSBORNE
ATTORNEY

INVENTOR.
ROGER H. EICHORN
ROBERT F. OSBORNE
ATTORNEY

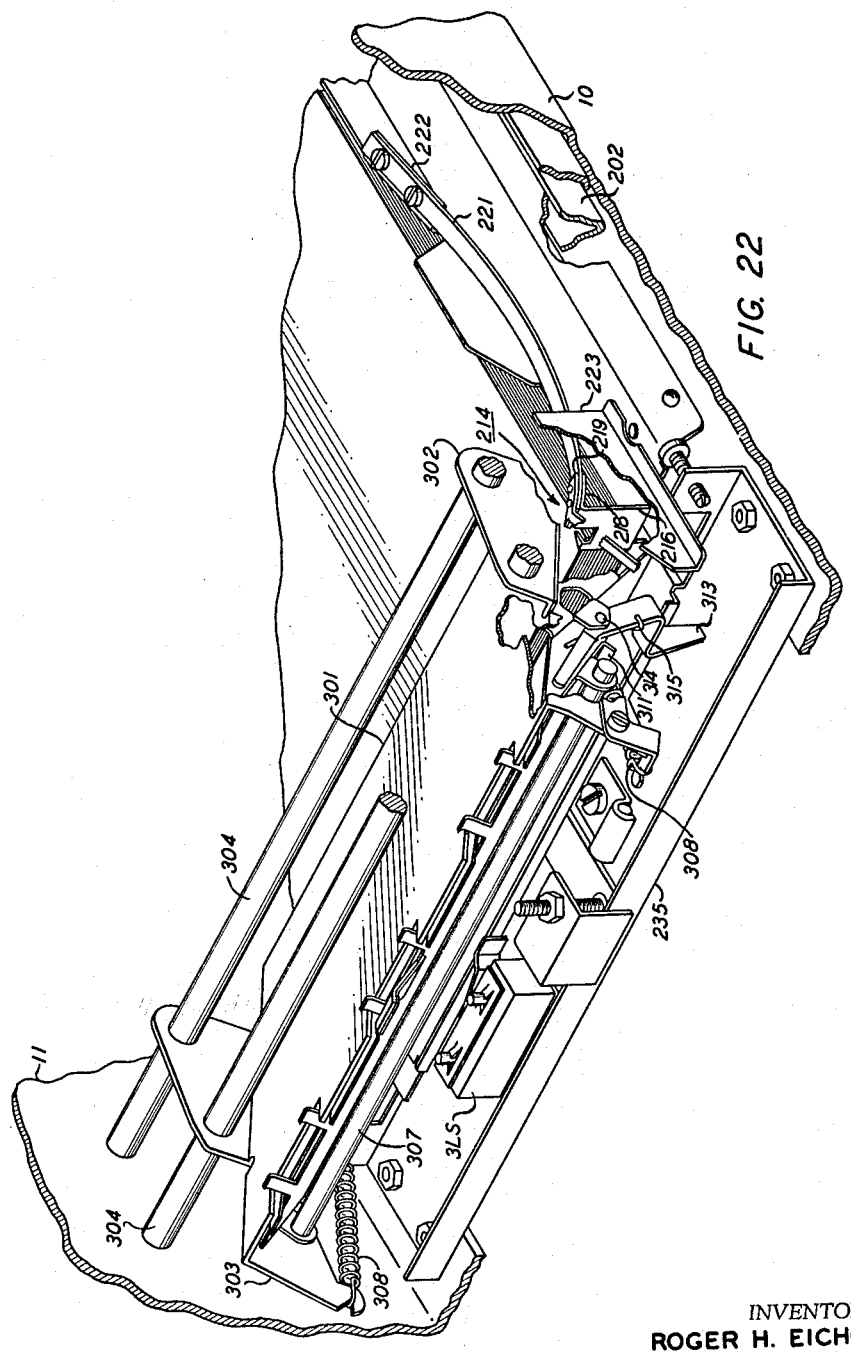

Aug. 6, 1963  R. H. EICHORN ETAL  3,099,944
XEROGRAPHIC CONTROL APPARATUS
Filed Dec. 28, 1961  27 Sheets-Sheet 16
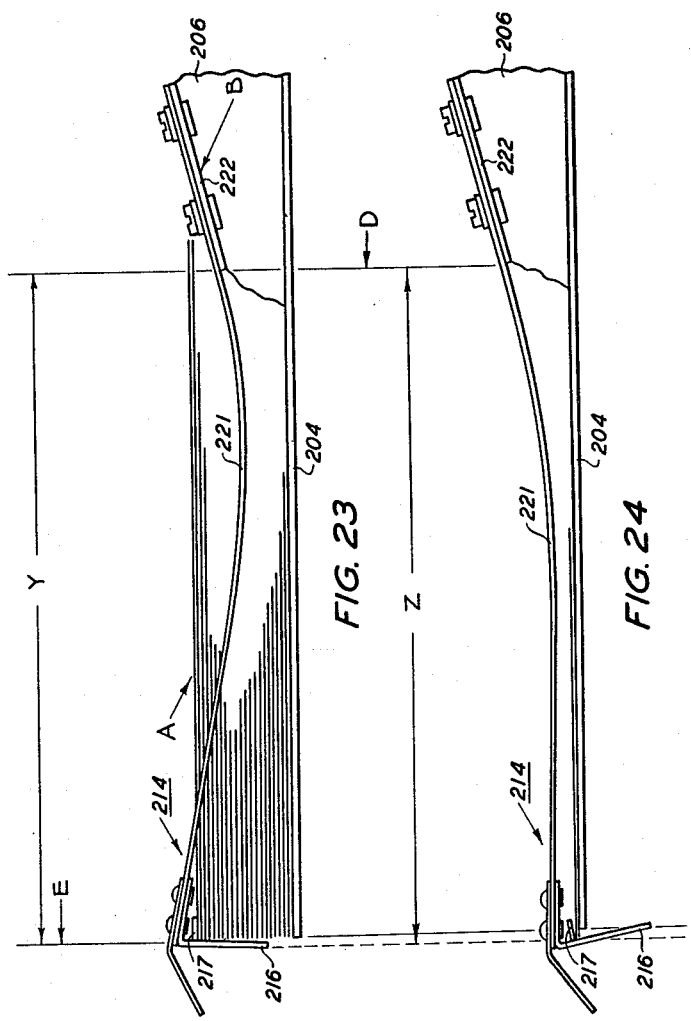
INVENTOR.
ROGER H. EICHORN
ROBERT F. OSBORNE
BY
ATTORNEY Aug. 6, 1963
R. H. EICHORN ETAL
3,099,944
XEROGRAPHIC CONTROL APPARATUS
Filed Dec. 28, 1961
27 Sheets-Sheet 17
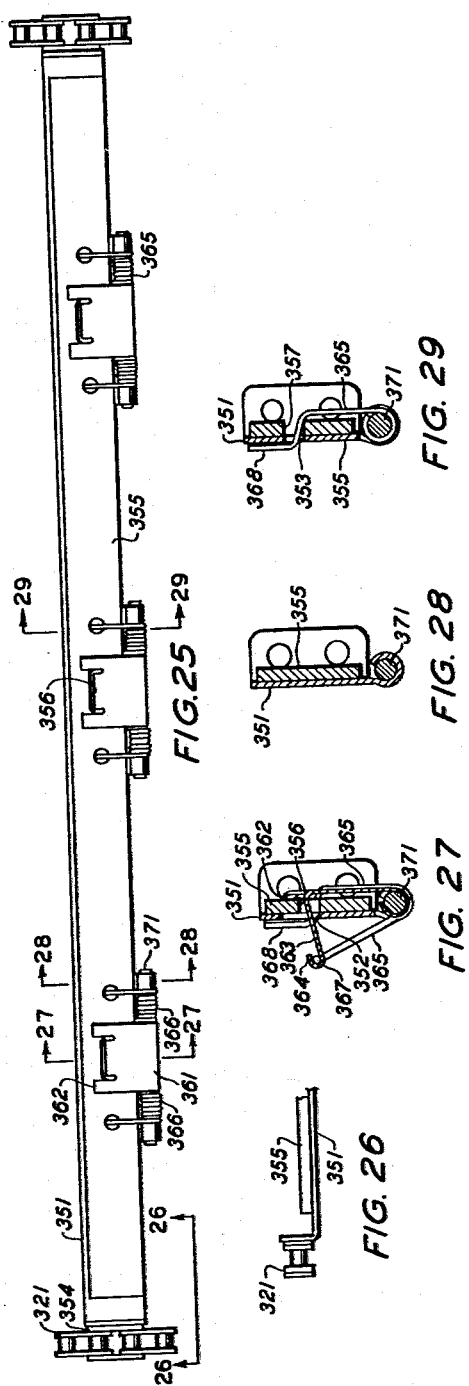
INVENTOR.
ROGER H. EICHORN
ROBERT F. OSBORNE
BY
ATTORNEY Aug. 6, 1963 R. H. EICHORN ETAL 3,099,944
XEROGRAPHIC CONTROL APPARATUS
Filed Dec. 28, 1961 27 Sheets-Sheet 18

INVENTOR.
ROGER H. EICHORN
ROBERT F. OSBORNE
BY
ATTORNEY

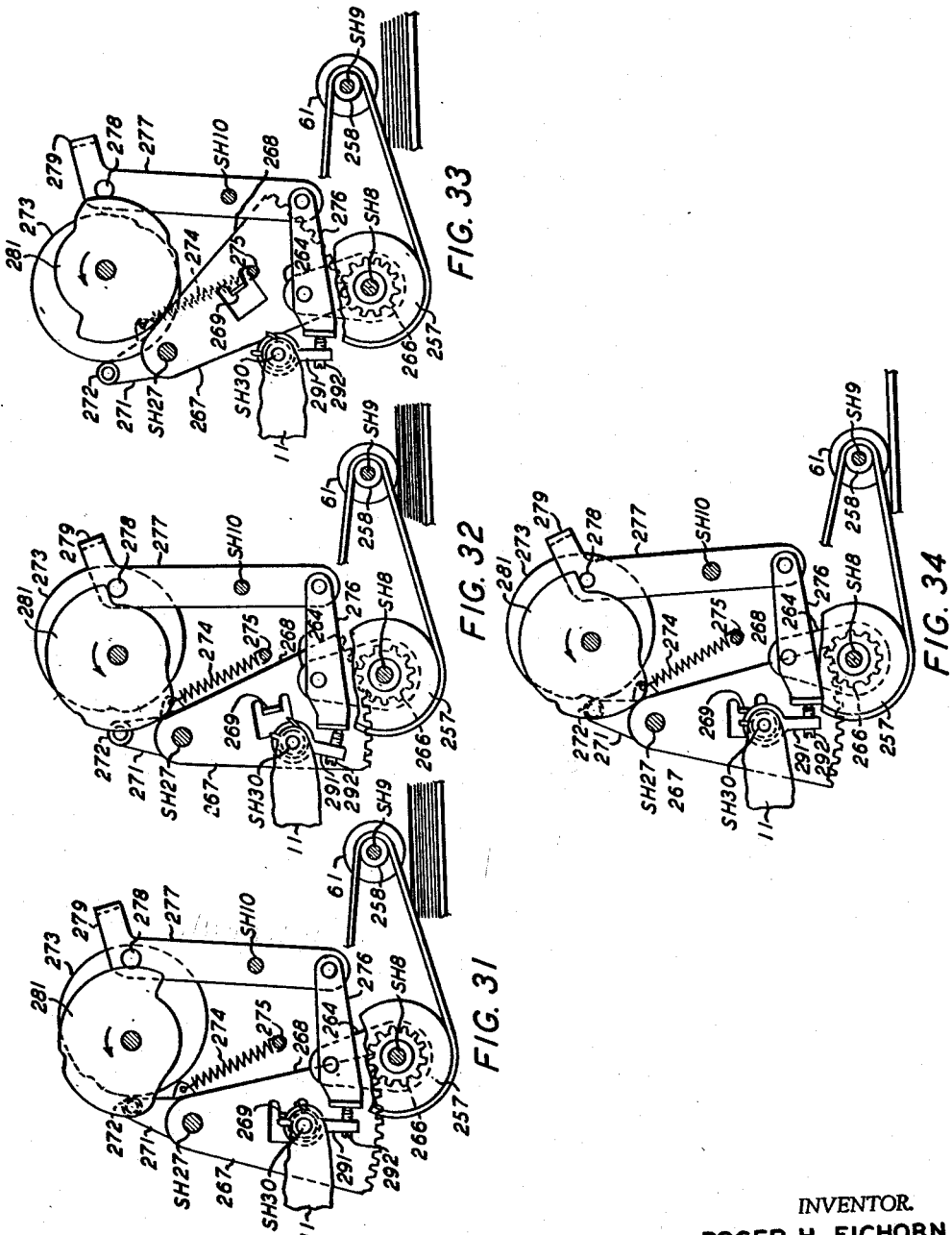

INVENTOR.
ROGER H. EICHORN
ROBERT F. OSBORNE
BY
ATTORNEY

Aug. 6, 1963   R. H. EICHORN ETAL   3,099,944
XEROGRAPHIC CONTROL APPARATUS
Filed Dec. 28, 1961   27 Sheets-Sheet 22

INVENTOR.
ROGER H. EICHORN
ROBERT F. OSBORNE
BY
ATTORNEY

Aug. 6, 1963   R. H. EICHORN ETAL   3,099,944
XEROGRAPHIC CONTROL APPARATUS
Filed Dec. 28, 1961   27 Sheets-Sheet 24
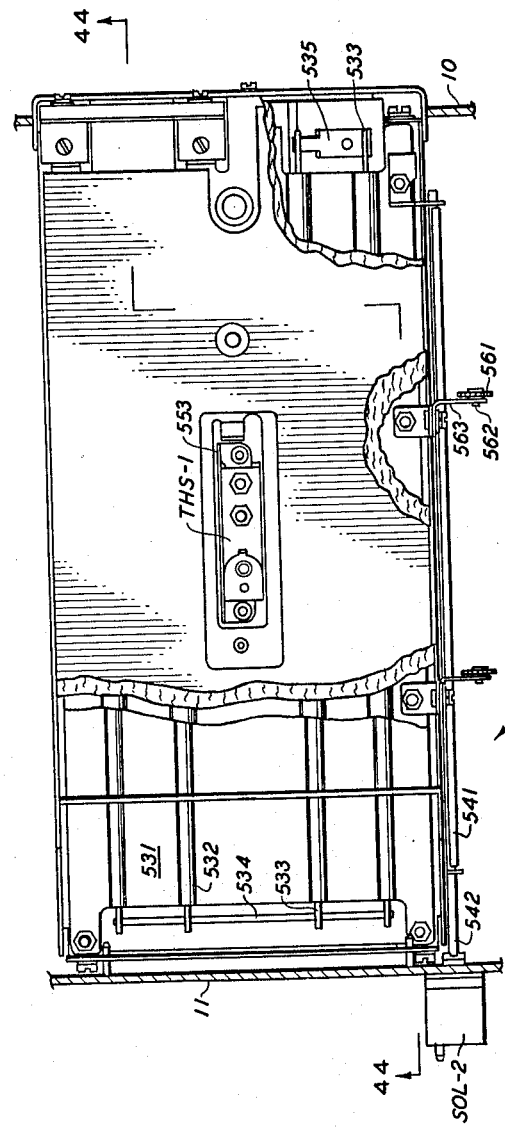
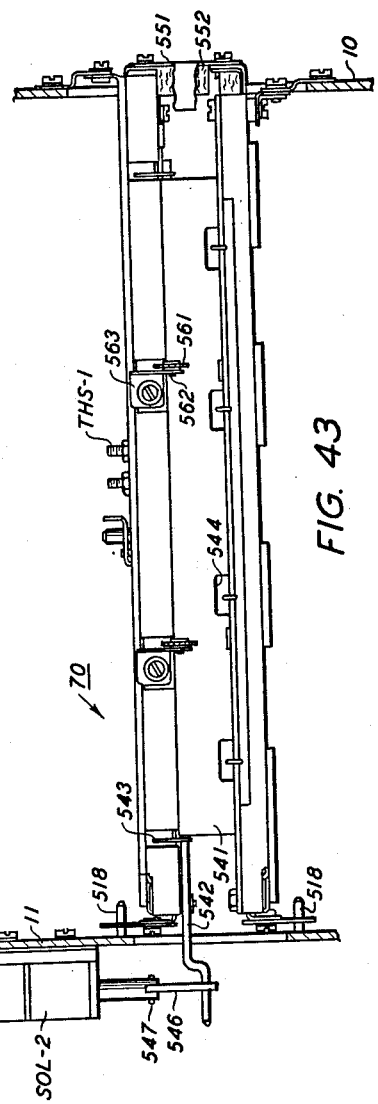
INVENTOR.
ROGER H. EICHORN
ROBERT F. OSBORNE
BY
ATTORNEY Aug. 6, 1963   R. H. EICHORN ETAL   3,099,944
XEROGRAPHIC CONTROL APPARATUS
Filed Dec. 28, 1961   27 Sheets-Sheet 25
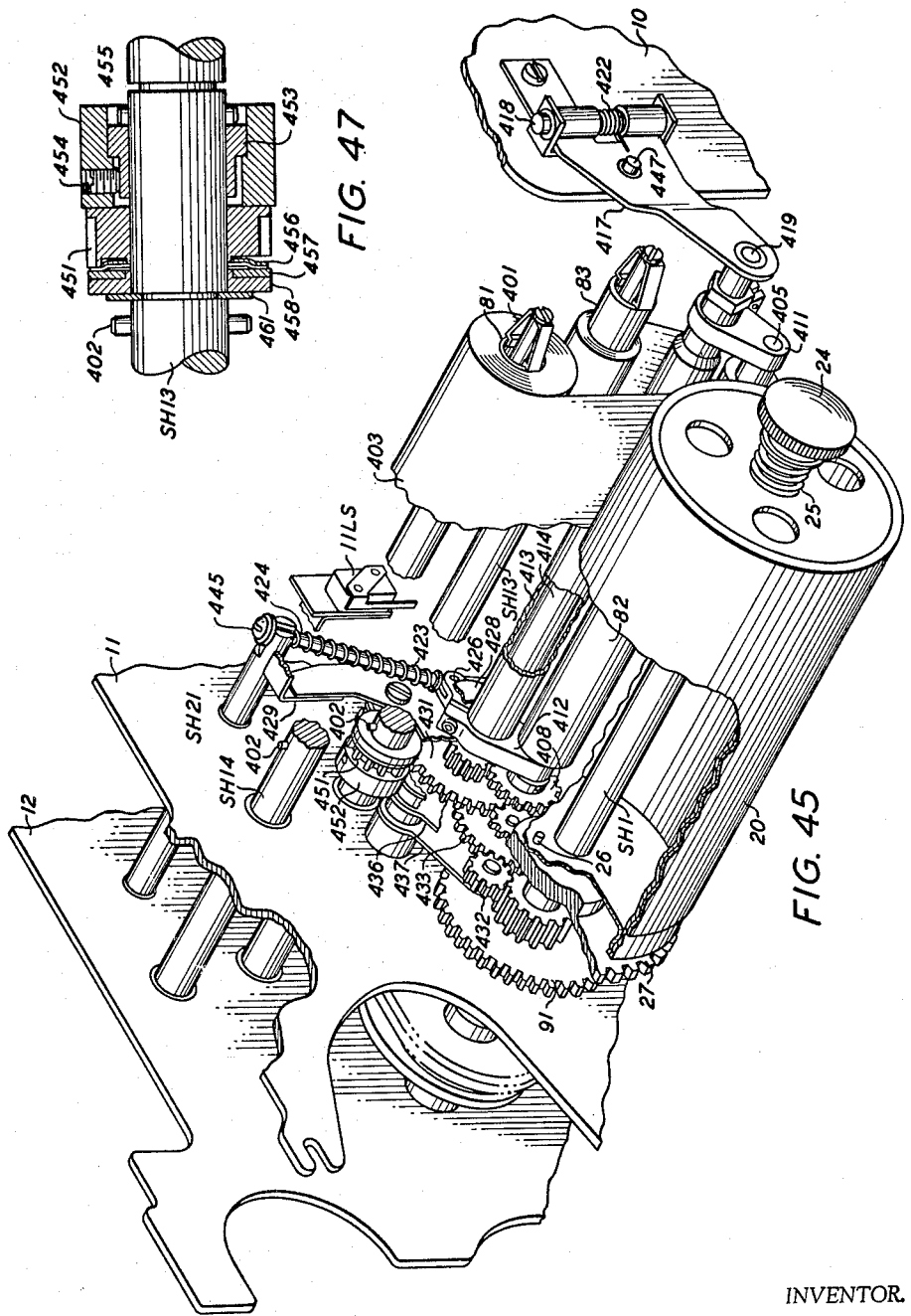
INVENTOR.
ROGER H. EICHORN
ROBERT F. OSBORNE
BY
ATTORNEY

INVENTOR.
ROGER H. EICHORN
ROBERT F. OSBORNE
BY
ATTORNEY

United States Patent Office 3,099,944
Patented Aug. 6, 1963

3,099,944
XEROGRAPHIC CONTROL APPARATUS
Roger H. Eichorn and Robert F. Osborne, Webster, N.Y., assignors to Xerox Corporation, Rochester, N.Y., a corporation of New York
Filed Dec. 28, 1961, Ser. No. 162,837
4 Claims. (Cl. 95—1.7)

This invention relates in general to xerography, and, in particular to an improved xerographic reproducing apparatus.

More specifically, the invention relates to an improved programmer mechanism for use in a xerographic apparatus to effect programming of the xerographic apparatus to make single, successive or multiple reproductions from a moving original or originals.

In the process of xerography, for example, as disclosed in either Carlson Patent 2,297,691, issued October 6, 1942, or in Carlson Patent 2,357,809, issued September 12, 1944, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity which reaches them and thereby creates an electrostatic latent image on or in the plate coating.

Development of the image is effected with developer material or developers which comprise, in general, a mixture of a suitable pigmented or dyed electrostatic powder, hereinafter referred to as toner, and a granular carrier material, which later functions to carry and to generate triboelectric charges on the toner. More exactly, the function of the granular material is to provide the mechanical control to the powder, or to carry the powder to an image surface and, simultaneously, to provide almost complete homogeneity of charge polarity. In the development of the image, the toner powder is brought into contact with the coating and is held thereon electrostatically in a pattern corresponding to the electrostatic latent image. Thereafter, the developed xerographic image is usually transferred to a support or transfer material to which it may be fixed by any suitable means.

Since the disclosure of the basic concept of xerography by Carlson, a variety of machines and devices have been proposed to incorporate such teachings in a manner to form copy xerographically on a commercial basis. For the most part, each of such devices has been specifically designed to the solution of a particular reproduction problem, and for the most part, has been limited to the particular use intended.

It is, therefore, the principal object of this invention to improve xerographic reproducing apparatus for general copying applications of the type normally encountered in business, engineering or law offices, the xerographic apparatus being capable of making copies quickly, automatically, economically and accurately.

Another object of this invention is to improve programmer mechanisms for xerographic reproducing apparatus so that a reproduction or reproductions of a single copy can be made automatically, or successive reproductions or successive reproductions of successive copies can be made automatically.

For a better understanding of the invention, as well as other objects and further features thereof, reference is had to the following detailed description of the invention to be read in connection with the accompanying drawings, wherein:

FIG. 11 is a sectional view taken along lines 11—11 of FIG. 6, illustrating a document stop;

FIG. 12 is a sectional view taken along lines 12—12 of FIG. 6, illustrating a document retainer and pressure finger;

FIG. 13 is a sectional view taken along line 13—13 of FIG. 6, illustrating the document lever;

FIG. 14 is a sectional view taken along line 14—14 of FIG. 6, illustrating the document latch stop mechanism;

FIGS. 15, 16, 17 and 18 are views similar to FIGS. 11, 12, 13 and 14, respectively, showing the position of the respective elements as a document is picked up by the gripper bars of the copy drum;

FIG. 19 is a perspective view of the paper feed mechanism of the apparatus;

FIG. 22 is a left-hand perspective view of the paper tray assembly and paper guide mechanism;

FIGS. 23 and 24 are enlarged views of the sheet stripper mechanism in position on a full stack, and in position on the last sheet of a stack, respectively;

FIG. 25 is a enlarged top view of a paper gripper;

FIG. 26 is a view of the paper gripper taken along line 26—26 of FIG. 25;

FIG. 27 is an enlarged view taken along line 27—27 of FIG. 25;

FIG. 28 is an enlarged view taken along line 28—28 of FIG. 25;

FIG. 29 is an enlarged view taken along line 29—29 of FIG. 25;

FIGS. 31, 32 and 33 are schematic illustrations of the paper separating and proportional feed mechanism showing the sequence of operation of these elements in full stack position;

FIG. 34 is a view similar to FIG. 32, but in an empty stack position;

FIG. 42 is a top view of the heat fuser apparatus with parts broken away;

FIG. 43 is a front view, in terms of the direction of paper travel, of the heat fuser;

FIG. 45 is a left-hand perspective view of the web cleaner apparatus viewed from the back of the machine;

FIG. 47 is an enlarged view of the clutch mechanism for the take up roll of the web cleaner apparatus; and, FIG. 48 is a schematic electrical circuit wiring diagram of the apparatus.

Figure 1:
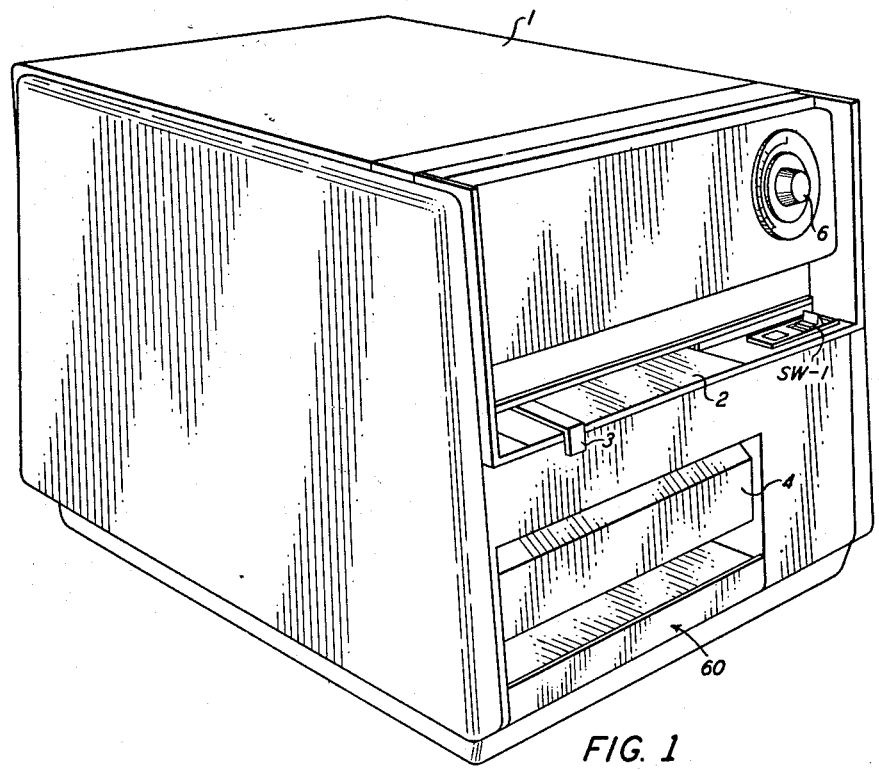
FIG. 1 is a left-hand perspective view of the xerographic apparatus of the invention.
Figure 2:
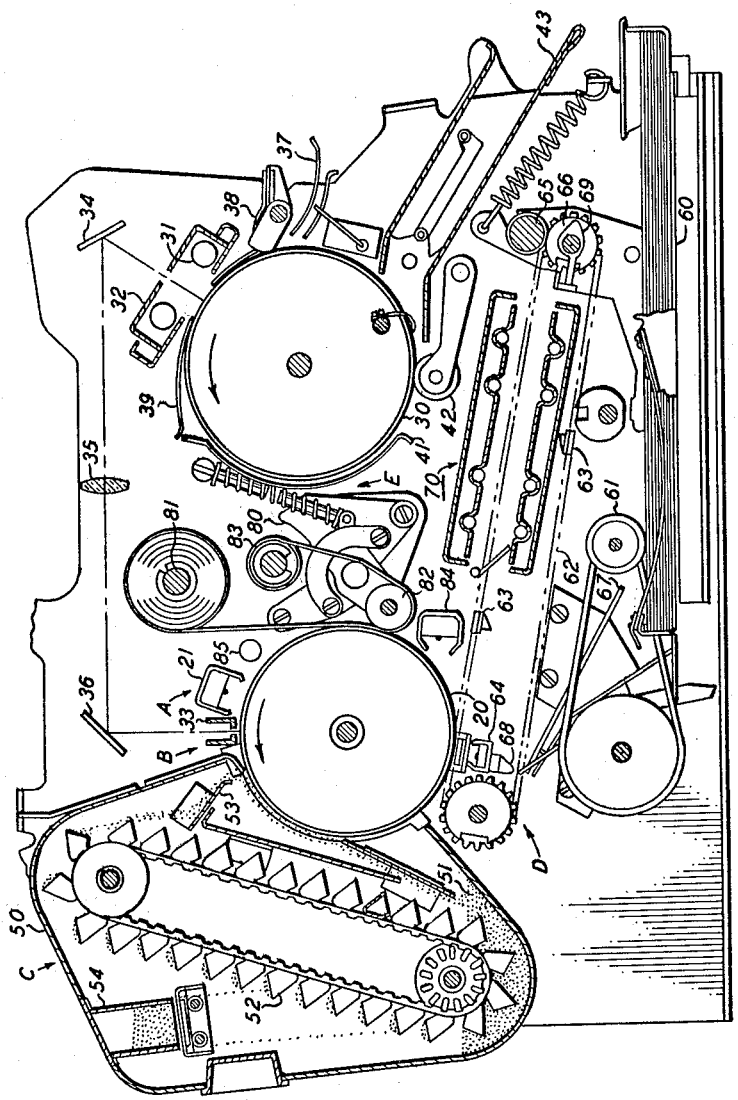
FIG. 2 is a schematic illustration of the apparatus of the invention.
Figure 3:
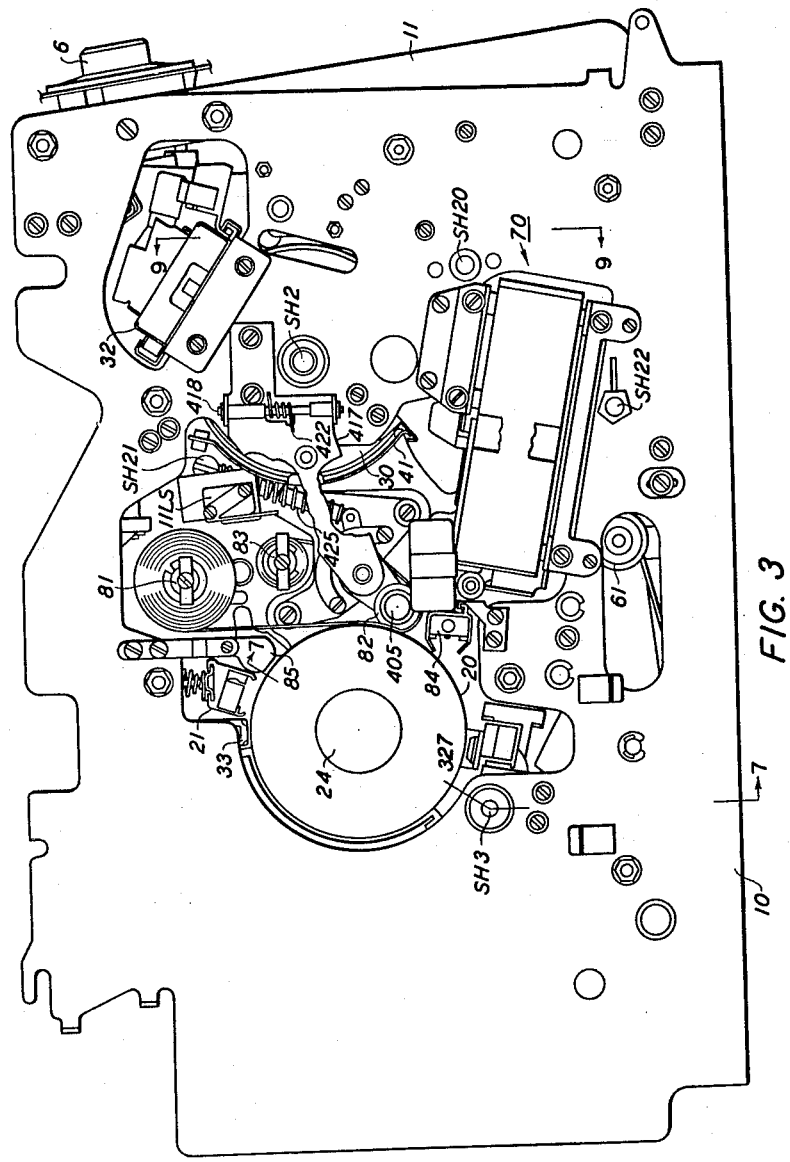
FIG. 3 is a left-hand view of the xerographic apparatus of the invention, with the cabinet covers removed.
Figure 4:
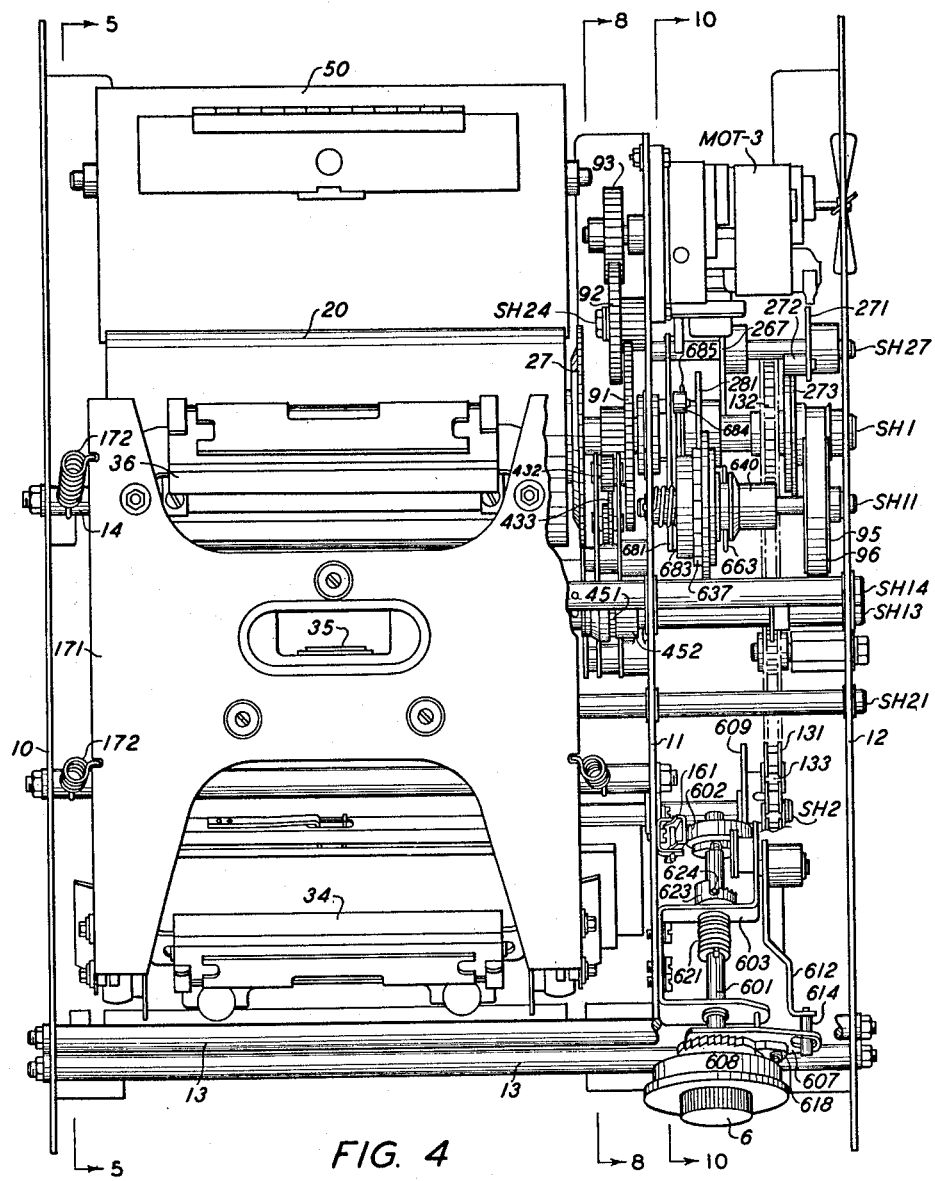
FIG. 4 is a top view of the apparatus of the invention, with the cabinet covers removed.

Referring now to the drawings, there is shown in FIG. 1 a xerographic reproducing apparatus used for producing xerographic reproductions from a moving original.

The xerographic reproducing apparatus is adapted for installation with a suitable light tight housing or cabinet of a size so that the entire unit may be mounted on an office desk or table.

The cabinet, generally designated 1, constructed in a conventional manner, has a shelf or table 2 and a movable side margin guide 3 on the front thereof to aid an operator to align and guide a document into the machine through a suitable ingress opening provided in the cabinet. On the right-hand side of the cabinet there is provided a control switch SW1, and a control knob 6 for a purpose described in detail hereinafter.

In the lower left-hand side of the cabinet is a document discharge guide 4, and beneath this guide is a paper supply tray which, when inserted into the position shown, appears to form part of the cabinet although it is a separate element.

*General*

As shown, the xerographic apparatus comprises a xerographic plate including a photoconductive layer or light-receiving surface on a conductive backing and formed in the shape of a drum, generally designated by numeral 20, which is journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powder image in the configuration of the copy to be reproduced;

A transfer station, at which the xerographic powder image is electrostatically transferred from the drum surface to a transfer material or support surface; and, A drum cleaning station, at which the drum surface is first charged and then brushed or wiped to remove residual toner particles remaining thereon after image transfer, and at which the drum surface is exposed to a relatively bright-light source to effect substantially complete discharge of any residual electrostatic charge remaining thereon.

The charging station is preferably located as indicated by reference character A, in the schematic illustration of the apparatus. In general, the charging apparatus or corona charging device 21 includes a corona discharge array of one or more discharge electrodes that extend transversely across the drum surface and are energized from a high potential source and are substantially enclosed within a shielding member.

Next subsequent thereto in the path of motion of the xerographic drum is an exposure station B. This exposure station may be one of a number of types of mechanisms or members such as desirably an optical scanning or projection system, or the like, designed to project a line copy image onto the surface of the photoconductive xerographic drum from a suitable original.

The optical scanning or projection assembly consists of a copyboard in the shape of a drum, hereinafter referred to as copy drum 30, which is adapted to support copy to be reproduced and arranged to rotate in light-projection relation to the moving light-receiving surface of the xerographic plate. Uniform lighting is provided by suitable lamps 31 attached to a slotted light reflector 32 mounted adjacent to the copy drum.

A slotted light shield 33, adapted to protect the xerographic plate from extraneous light, is positioned adjacent to the surface of the xerographic plate. A slot aperture in the light shield extends transversely to the path of movement of the light-receiving surface of the xerographic drum 20 to permit reflected rays from the copy drum to be directed against a limited transverse area of the light-receiving surface as it passes therebeneath.

To enable the optical system to be enclosed within a relatively small cabinet, a folded optical system including an object mirror 34, a lens 35, and an image mirror 36, is used in the preferred embodiment of the apparatus.

A document fed through document guides 37 to the copy drum is removably secured thereon by a suitable gripper mechanism for movement therewith in timed relation to the movement of the xerographic drum whereby a flowing image of the copy is projected onto the xerographic drum. The copy is held against the surface of the copy drum until gripped by means of document retaining guides 38. Pressure guides 39 and document guard 41 retain and guide the trailing edge of the document on the copy drum. After the copy is scanned it is released from the copy drum to be transported out of the machine by the copy drum and document feed out rollers 42 through document feed out guide 43.

Adjacent to the exposure station is a developing station C in which there is positioned a developer apparatus 50 including a developer housing having a lower or sump portion for accumulating developer material 51. Mounted within the developer housing is a driven bucket-type conveyor 52 used to carry the developer material previously supplied to the developer housing to the upper portion of the developer housing from where the developer material is cascaded over a hopper chute 53 onto the drum.

As the developer material cascades over the drum, toner particles of the developer material adhere electrostatically to the previously formed electrostatic latent image areas on the drum to form a visible xerographic powder image; the remaining developer material falling off the peripheral surface of the drum into the bottom of the developer housing. Toner particles consumed during the developing operation to form the xerographic powder images are replenished by a toner dispenser 54, of the type disclosed in copending application Serial No. 776,976, filed November 28, 1958, in the name of Robert A. Hunt, now Patent No. 3,013,703, mounted within the developer housing.

Positioned next adjacent to the developing station is the image transfer station D, which includes suitable sheet feeding mechanism adapted to feed sheets of paper successively to the xerographic drum in coordination with the presentation of the developed image on the drum at the transfer station. The sheet feeding mechanism includes a sheet source, such as paper tray 60, for a plurality of sheets of a suitable support material, that is, sheets of paper or the like, separator rollers 61 adapted to feed the top sheet of the stack of support material through a guide 67 to a sheet conveyor mechanism 62 having paper grippers 63 thereon which carry the sheet support material into contact with the rotating xerographic drum in coordination with the appearance of a developed image at the transfer station.

The transfer of the xerographic powder image from the drum surface to the support material is effected by means of a corona transfer device 64 that is located at or immediately after the point of contact between the support material and the rotating xerographic drum. The corona transfer device 64 is substantially similar to the corona discharge device that is employed at the charging station in that it also includes an array of one or more corona discharge electrodes that are energized from a suitable high potential source and extend transversely across the drum surface and are substantially enclosed with a shielding member. In operation, the electrostatic field created by the corona transfer device is effective to tack the transfer material electrostatically to the drum surface and simultaneously with the tacking action, the electrostatic field is effective to attract the toner particles comprising the xerographic powder image from the drum surface and cause them to adhere electrostatically to the surface of the support material.

As the paper gripper mechanism continues to move forward in its closed circuit, it will strip the support material from the xerographic drum and carry it to a fixing device, such as, for example, heat fuser 70, whereat the developed and transferred xerographic powder image on the support material is permanently fixed thereto.

After fusing, the finished copy is preferably discharged from the apparatus at a suitable point for collection externally of the apparatus. To accomplish this, there is provided a pair of delivery rolls 65 and 66, by means of which the copy is delivered from the machine after it is released by the gripper mechanism. Suitable cam means 68 and 69 are provided at the receiving and delivery stations of the conveyor mechanism, respectively, to actuate the paper grippers at these stations to receive or discharge a sheet of support material.

The next and final station in the device is a drum cleaning station E, whereat any powder remaining on the xerographic drum after the transfer step is removed and whereat the xerographic drum is flooded with light to cause dissipation of any residual electrical charge remaining on the xerographic drum.

To aid in the removal of any residual powder remaining on the xerographic drum there is provided a corona precleaning device 84 that is substantially similar to the corona discharge device that is employed at charging station A. Removal of residual powder from the xerographic drum is effected by means of a web cleaner device 80 adapted to continuously feed a clean fibrous web material into wiping contact with the xerographic drum. As shown, the web material 55 is taken from a supply roll 81 and transported around a cleaning or pressure roll 82, preferably made of rubber, onto a take-up or rewind roll 83.

Any residual electrical charge remaining on the xerographic drum is dissipated by light from a fluorescent lamp 85 mounted in a suitable bracket above the xerographic drum, a suitable starter and ballast being provided for energizing the fluorescent lamp.

Suitable drive means drive the xerographic drum, the copy drum, the sheet conveyor mechanism at predetermined speeds relative to each other, and to effect operation of the paper separator roll, and the web cleaner mechanism, the latter being driven at a speed or speeds whereby relative movement between the xerographic drum and the web material is effected. Suitable drive means are also provided for effecting operation of the conveyor mechanism and toner dispenser of the developing apparatus assembly.

Referring now to the drawings, there is provided a frame for supporting the components of the apparatus formed by left-hand plate 10, intermediate plate 11 and right-hand plate 12, connected together and maintained rigidly in spaced relation to each other by suitable tie rods 13 and 14.

Figure 7:
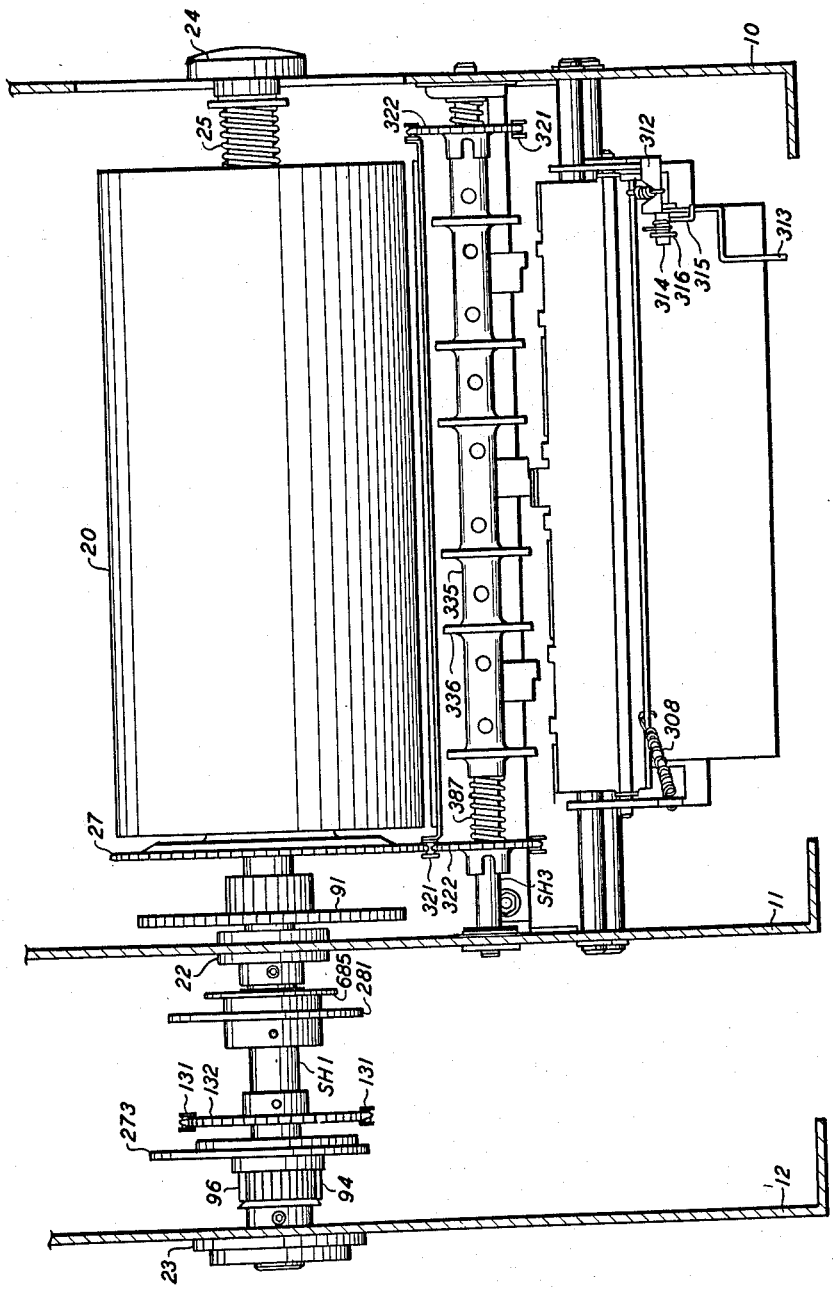
FIG. 7 is a sectional view taken along lines 7—7 of FIG. 3, with elements normally positioned in the background removed.

The xerographic drum 20, having a layer of photoconductive insulating material on a conductive backing, is mounted on horizontally driven shaft SH1, that rotates in bearing 22 and 23 mounted in plates 11 and 12, respectively. The free end or right-hand end of shaft SH1, as seen in FIGS. 7 and 45, is threaded to receive nut 24. Spring 25, encircling the free end of the shaft, forces the drum to the left into driven engagement with pin 26 extending from the hub portion of sprocket 27 secured to shaft SH1. The left-hand end of the drum is provided with a suitable aperture, to receive the pin 26.

*Exposure Mechanism*

The exposure mechanism of the xerographic reproducing apparatus is designed to use an optical projection or scanning mechanism adapted to scan a document or copy wrapped around a rotating copy drum and to project a flowing image of the document or copy onto the photoconductive surface of the rotating xerographic drum.

As shown, the scanning mechanism includes a feeding station, a copy station, an exposure station, and means for moving the document through the copying station in synchronism with the movement of the xerographic drum.

The feeding station includes a document guide 37 extending between frame plates 10 and 11, through which a document or copy to be reproduced is moved forward into engagement with the copy drum 30 and the document stops of the document retaining guide 38, the latter orientating and holding the document in position to be gripped by the gripper fingers of the copy drum.

Document retaining guide 38 includes shaft 101 journaled in bearings 102 and 103 positioned in frame plates 10 and 11, respectively. Axial alignment of the shaft is maintained by retaining rings 104 positioned in suitable grooves formed in the shaft adjacent opposite sides of bearing 103.

A spacer plate 105 is fixed to the shaft 101. Mounted in spaced relation to each other on the spacer plate are a series of pressure fingers 106 adapted to be brought into contact with the peripheral surface of the copy drum or a document sandwiched therebetween to hold the trailing edge of a document against the copy drum. A series of document stops 107 and document retainers 108 are loosely mounted on the shaft 101 in alignment with the notched out portions of the spacer plate. As shown in FIG. 11, the document stops 107 are normally biased into engagement with the peripheral surface of the copy drum by means of leaf springs 111 fixed to the spacer plate.

A document inserted into the document guide 37, by an operator, is forced into contact with the copy drum by the document retainers 108 and its forward progress is arrested by the document stops which also serve to align the leading edge of the document in parallel relation to the axis of the copy drum. Each document retainer is loosely journaled on the shaft 101, in an off-center position, so that the document retainer will normally rotate by its own weight into contact with the copy drum or into contact with a document sandwiched therebetween with sufficient force to hold the document against the peripheral surface of the copy drum. The weight of the document retainers is such that the force asserted by the document retainers against the copy drum is of such a limited magnitude that although the document retainers will hold a document against the copy drum, the document retainers will move when contacted by the leading edge of a document to permit a document to be inserted between the document retainers and the copy drum.

Figure 6:
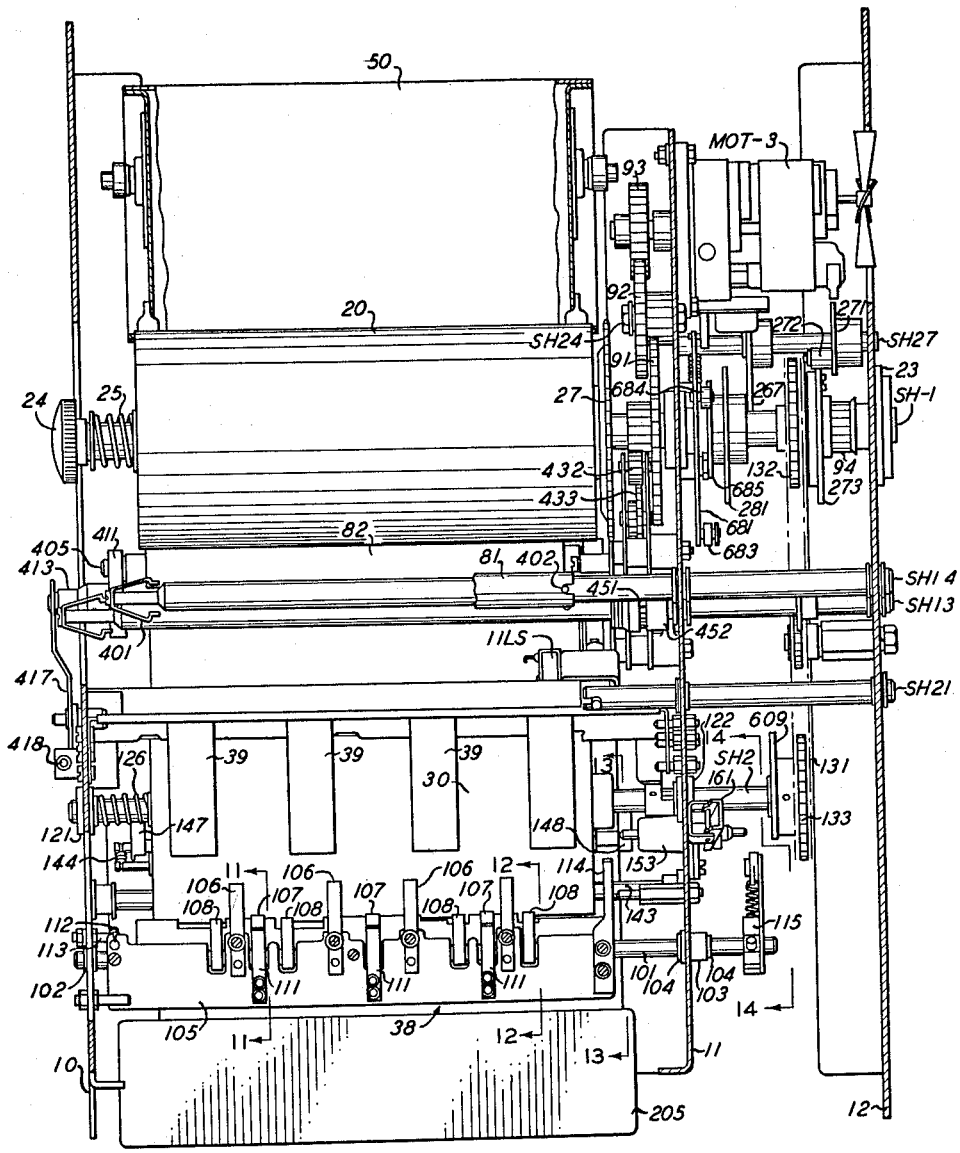
FIG. 6 is a top view of the apparatus similar to FIG. 4, but with the optical projection mechanism removed.

Secured to the right-hand end of the spacer plate, as seen in FIG. 6, is an actuator lever 114 which extends beyond the end of the copy drum, and mounted on the right-hand end of shaft 101 is a latch stop 115, for reasons described in detail hereinafter.

Figure 5:
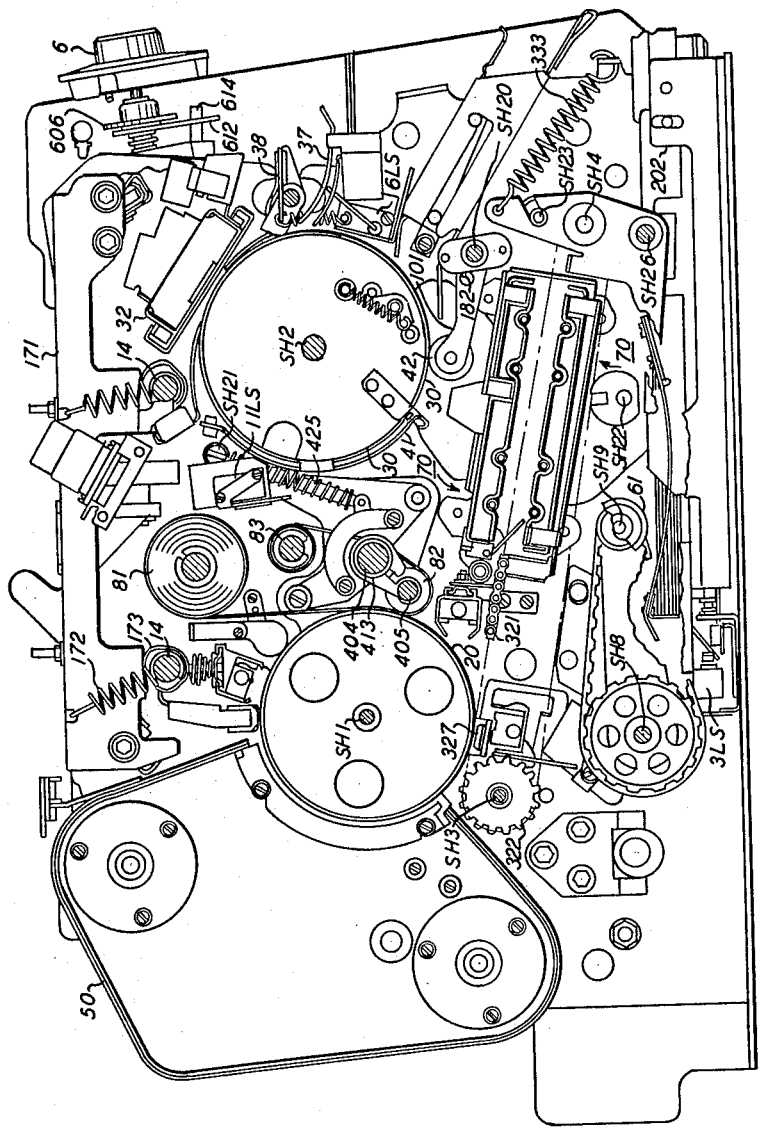
FIG. 5 is a sectional view of the apparatus taken along line 5—5 of FIG. 4.

The shaft 101 is normally biased in a counterclockwise direction, as seen in FIG. 5, by a spring 112 to normally force the document stops and pressure fingers into engagement with the peripheral surface of the copy drum. The spring 112 is connected at one end to a pin 113 fixed in frame plate 10, and at its other end to the spacer plate 105, a suitable aperture being provided in the spacer plate for attaching the bent end of the spring.

The copy drum 30 is fixed on shaft SH2 rotatably supported in bearings 121 and 122 mounted in frame plates 10 and 11, respectively.

Shaft SH2 is maintained in axial alignment by means of retaining rings 123 positioned in suitable grooves formed in shaft SH2 adjacent the bearings 121 and 122.

The hub 124, fixed to shaft SH2, is provided with an axial hub pin 125 adapted to extend into a suitable aperture in the right-hand end plate of the copy drum by means of which the copy drum is secured for rotation with the shaft. The copy drum is normally biased into driven engagement with the hub pin by spring 126 encircling left-hand end of shaft SH2, as seen in FIG. 9.

Figure 10:
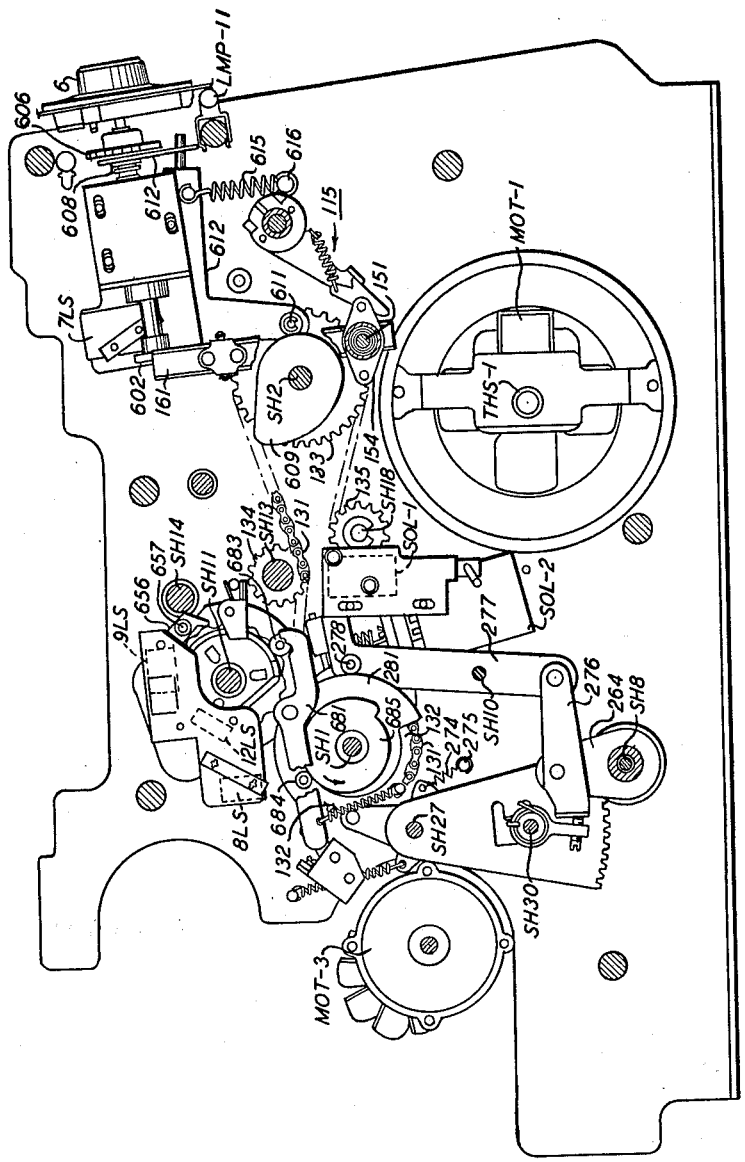
FIG. 10 is a sectional view taken along lines 10—10 of FIG. 4.

The copy drum is driven in timed relation with the xerographic drum by means of chain 131 which runs on sprockets 132 and 133, fixedly mounted on shafts SH1 and SH2, respectively. As shown in FIG. 10, the chain 131 extends from sprocket 132, under sprocket 134 journaled on shaft SH13, around sprocket 133, over idler sprocket 135 journaled in stub shaft SH18, then back around sprocket 132.

The peripheral surface of the copy drum 30 is provided with slots 141 parallel and in line with each other through which gripper fingers 142 extend to grip the leading edge of a document against the peripheral surface of the copy drum. The gripper fingers are secured to rocker shaft 143 which is rotatably journaled in bearings 138, mounted in the end plates of the copy drum, in such a manner that upon rotation of the rocker shaft the gripper fingers are moved in unison into and out of operative pressure relationship with the peripheral surface of the copy drum. Axial alignment of the rocker shaft is maintained by retaining rings 139 positioned in suitable grooves formed in the rock shaft.

Figure 9:
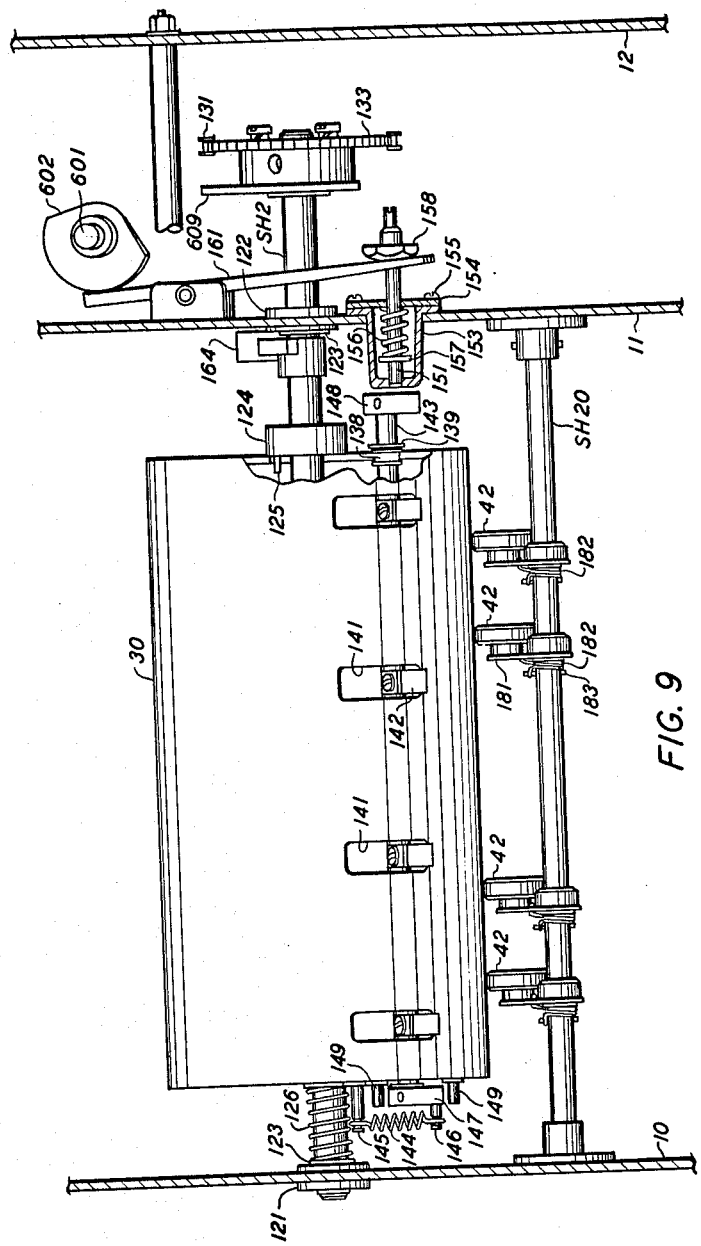
FIG. 9 is a sectional view taken along lines 9—9 of FIG. 3.

The gripper fingers are normally biased into operative pressure relationship against the peripheral surface of the copy drum by means of a spring 144 secured at one end to a stud 145, extending from the left-hand end plate of the copy drum, as seen in FIG. 9, and connected at its other end to pin 146 extending from lever 147 secured to the left-hand end of the rocker shaft 143. A cam lever 148 is secured to the right-hand end of the rocker shaft, as seen in FIG. 9, in position to be engaged by interposer pin 151 for opening the gripper mechanism to receive a document or to release a document.

The interposer pin for opening the gripper mechanism is adapted to be moved manually either into position for operative engagement with the cam lever 148 on the rocker shaft as the copy drum rotates, or alternatively, into an inoperative position so as to clear the cam lever for the purpose described in greater detail hereinafter. When the interposer pin 151 is in its operative position, as shown in FIG. 6, the rocker shaft is automatically actuated during each revolution of the copy drum so that a document retained by the gripper fingers is released for delivery from the machine and the gripper fingers remain open sufficiently long enough to receive a new or second document. Rotational movement of the rocker shaft is limited by means of stop studs 149 secured to the left-hand end plate of the copy drum in position to be engaged by lever 147.

To permit multiple scanning of a document, the interposer pin 151 is moved to the right, to the position shown in FIG. 9, out of interference relation with cam lever 148, by an operator through the manipulation of control knob 6, as described in greater detail hereinafter.

The interposer pin 151 is slideably mounted in a housing 153 and housing cap 154 secured to frame plate 11 by means of screws 155 threaded therein. The interposer pin 151 is normally biased into interference relation with cam lever 148 by means of spring 156 encircling the interposer pin and butting at opposite ends against the housing cap 154 and the retaining ring 157 positioned in a suitable groove formed in the interposer pin.

An actuator lever 161, journaled on pin 162 positioned in bracket 163 secured to frame plate 11, is used to move the interposer pin out of interference relation to cam lever 148. The forked end of the actuator lever encircles the interposer pin behind the interposer stop 158 secured at one end thereon, and at its other end the actuator lever is positioned to be actuated by a cam 602 of the programmer mechanism described in detail hereinafter.

To permit a document retained by the document stops to be gripped by the gripper fingers of the copy drum, the actuator lever 114 of document retaining guide 38 is positioned on shaft 101 so that it extends beyond the right-hand edge of the copy drum in interference relation with the rocker shaft 143, whereby shaft 101 is rotated to move the document stops carried thereon out of engagement with the leading edge of the document in timed relation with the gripping of the leading edge of the document by the gripper fingers 142.

As the document, gripped at its leading edge between the gripper fingers and the peripheral surface of the copy drum, is transported thereby through the copying station, as defined by the slotted light reflector 32, successive portions of the document are uniformly illuminated by lamps 31. As shown in the electrical wiring diagram, four lamps are used to illuminate the copy, that is, a pair of fluorescent lamps LMP2 and LMP3, and a pair of incandescent lamps LMP4 and LMP5.

To receive the image of the document reflected through the light reflector, there is provided an object mirror 34 which reflects the image through lens 35. An image mirror 36 is positioned in the light path from the lens to reflect the image onto the xerographic drum through the slot aperture of the light shield 33. The lens 35 and two mirrors are suitably secured to an optical mounting bracket 171 supported by tie rods 14 extending between plates 10 and 11. The mounting bracket is held in position on the tie rods by means of springs 172, secured to the mounting bracket and at the opposite end to the tie rods. Suitable light baffles, not shown, are secured to the underside of the optical mounting bracket 171 to shield the lens 35 from extraneous light.

The slotted light shield 33 is simply an open elongated box, the bottom wall of which has a narrow slot aperture extending across its length. The light shield is suitably mounted, by clamp assembly 173 to a tie rod 14 extending between plates 10 and 11, directly above and in close proximity to the peripheral surface of the xerographic drum with the center line of the slot aperture parallel to the axis of shaft SH1.

As a document is conveyed through the copying station, the trailing portion of the document is retained against the peripheral surface of the copy drum by pressure fingers 106 on shaft 101 and then, as it leaves the copying station, by pressure guides 39. The pressure fingers 106 and pressure guides 39 also perform the function of holding creased or wrinkled documents flat in the exposure region. The pressure guides 39 and the curved document guard 41 are secured at opposite ends to brackets 164 fastened to plates 10 and 11.

After a document has been scanned, the rocker shaft 143, is actuated to release the document whereby it is forwarded by feed-out rollers 42, coacting with the peripheral surface of the copy drum, through the document feed-out guides 43.

The feed-out rollers 42 are rotatably mounted on arms 181 journaled on shaft SH20 secured against rotation between the plates 10 and 11. Each of the arms 181 is biased by means of a torsion spring 182 to yieldingly force the feed-out roller carried thereby against the peripheral surface of the copy drum or against a document sandwiched therebetween. One end of each torsion spring is secured to a radial pin 183 extending from the shaft SH20 and the other end of each spring is secured to the arm 181 with which it coacts.

Paper Feed System

The sheet feeding mechanism is positioned at the transfer station of the xerographic apparatus for seriatim feeding of cut sheet support material, such as paper or the like, into contact with the xerographic drum so that the developed powder image on the surface of the drum can be transferred to the support material. The sheet feeding mechanism consists of a tray 60 for holding a supply of cut sheet support material, separator rollers 61 for separating a single sheet of support material from the tray and forwarding it to a guide having a receiving slot in the front thereof and a movable gate to block the receiving slot so that the sheet can be arrested and held for delivery by a sheet conveyor mechanism.

The sheet of support material forwarded into the guide by the separator rollers is advanced by a sheet conveyor mechanism into contact with the xerographic drum adjacent to the corona transfer device whereat the powder image previously formed on the drum is transferred from the drum to the sheet of support material, the sheet of support material then being forwarded by the conveyor mechanism to the heat fuser for fusing of the powder image onto the sheet, and then to a set of delivery rolls which deliver the sheet of support material from the machine.

A supply of cut sheet support material, such as paper, to be fed one at a time to the sheet conveyor 62 is held in a paper tray 60 movably positioned at the front of the machine between the frame plates 10 and 11, by means of a pair of suitable slides 202 and 203, so that the paper tray can be extended beyond the outer margin of the cabinet of the machine.

The paper tray 60 includes a platform or support 204 for the paper. The platform is formed with a turned-up portion at one end to support hinged cover plate 205. Left-hand paper guide 206 and right-hand paper guide 207 are positioned to extend across the length of the platform to align the left-hand and right-hand side margins, respectively, of a stack placed on the platform.

In the embodiment shown, the left-hand paper guide 206 is secured, as by welding, to the platform. The right-hand paper guide 207 is provided with a lateral leg adapted to rest on the platform 204. A depending pin 208, secured to the lateral leg of this guide, extends through a suitable elongated slot in the platform to permit lateral movement of the guide to accommodate various width sheets. The right-hand paper guide is releasably locked in position on the platform by actuation of a cam lever 211. The cam lever 211 is pivotably secured to one end of a cam bracket 212. The cam bracket 212, which extends through an aperture in the platform, has a leaf spring 213 secured to its opposite end. As the cam lever is rotated to lock the right-hand guide, the cam portion of the cam lever will strike the platform to cause the cam bracket to rise, thus forcing the leaf spring into contact with the underside of the platform.

In feeding sheets from a stack one at a time, as the topmost sheet is advanced forward, the movement of the topmost sheet will tend to advance the second sheet also. In order to ensure separation of the topmost sheet only from the stack, there is provided at opposite corners of the stack, separators of snaps 214 and 215, sometimes referred to as stripper pins, which apply a restraining force on the topmost sheet and leading edge of the paper stack. The downward restraining force exerted by the separators or snaps must be small to permit the topmost sheet to be advanced from under the separators or snaps.

If the paper stack is forced too tightly against the stop portion of the snap, the snap may be prevented from following the stack as each sheet is fed because the downward force exerted by the snap is not sufficient to move the stack. When this occurs, the snap remains jammed against the stack and will eventually cease to function to prevent misfeeding or a double feeding of sheets from the stack.

Since the separators or snaps 214 and 215 are formed complementary to each other, it is believed necessary to describe only one of the separators or snaps in detail.

Figure 21:
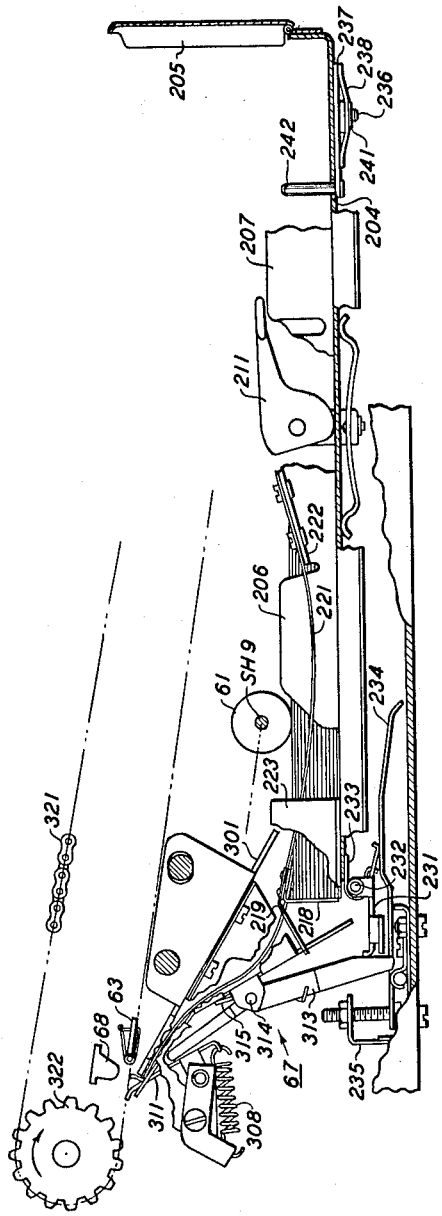
FIG. 21 is a side view of the paper tray assembly and paper guide mechanism with parts broken away to show details of the structure.

The separator or snap 214 includes a depending stop portion 216, which in its normal operative position, as shown in FIG. 21, constitutes a stop for the leading edges of the sheets forming the stack, a rearwardly extending leg 217 extending from the stop portion to rest on the topmost sheet of the stack, and a support portion 218 used to fasten the snap to its support arm. These elements of the separator or snap are formed either as a unitary structure from sheet metal, as shown, or as separate elements secured together.

The separator or snap 214 and a finger 219, described in detail hereinafter, are secured to the free end of a support arm 221, which in the embodiment shown is a leaf spring. The opposite end of the leaf spring is fixed to a spring mount 222 which may be formed as an integral part of a paper guide, as shown, or as a separate element secured to the platform of the paper tray.

The spring mount 222 has a support surface thereon to which the leaf spring is secured, the supported surface being inclined at an angle to intersect the plane of the platform behind its left-hand end, as seen in FIGS. 21, 23 and 24. The point of intersection of the plane of the support surface with the plane of the platform should be a short distance behind, in reference to the path of travel of a sheet as it is advanced from the paper tray, the leading edge of the bottommost sheet of a stack supported in the paper tray.

With this mounting arrangement, the leaf spring 221 will always be bent or deflected in a slight arc even when the paper tray is empty. The leaf spring will always bias the separator or snap downward. The difference in force applied to the snap when the leaf spring is bent to accommodate a full stack, as compared to the force applied to the snap when the leaf spring is bent to accommodate the last sheet of a stack, is within an acceptable limit for proper functioning of the snap.

The stationary part of the leaf spring is secured to its spring mount 222 on the paper guide, whereby the fixed portion of the leaf spring is positioned above the plane of the platform so that the point of deflection of the free end of the leaf spring is above the platform. By mounting the leaf spring at an angle to intersect the plane of a platform, the radius of the arc or effective path traveled by the snap from a full stack position to an empty stack position will continuously increase.

With this arrangement, the snap will travel in a path to increase the effective distance from the snap to the fixed end of the leaf spring. Thus, the snap will always move away from the front or leading edge of the stack by a small margin, as successive sheets are fed, to prevent the snap from binding against the leading edge of the stack.

In operation, as the topmost sheet is advanced by the separator rollers, the leading edge corners of the sheet engage the snaps whereupon the sheet will buckle. This buckling action of the topmost sheet ensures its separation from the underlying sheets in the stack. The first two or three sheets beneath the uppermost sheet being advanced will also move forward to contact the snap, but the frictional force applied by these few sheets against the snap will not be sufficient to render the snap inoperative for those intended purposes.

Referring now to FIG. 23, which illustrates the leaf spring bent to accommodate a full stack of paper, and FIG. 24, which illustrates the position of the spring when the tray is empty, reference A represents the paper stack, reference 222 the spring mounting, and 214 the snap. Line D is a vertical line extending from the corner edge of the spring mount 222 controlling the spring deflection. The distance measured horizontally from line D to the line E extending vertically from the snap when positioned on a full stack is represented by Y. The distance from line D to the line extending vertically from the snap when in contact with the platform when the tray is empty is represented by Z. The distance Y is less than the distance Z because of the angle relationship between the spring mount and the platform, the spring mount being positioned above the platform, as shown.

This change in the path traveled by the snap away from the leading edge of the stack, as represented in FIG. 23, to its position shown in FIG. 24, is expressed as distance F.

Inasmuch as it usually requires a bottom sheet of a stack to travel further to its point of delivery than the topmost sheet of a stack, the above-described action of the snap allows the lower sheets of the stack to advance slightly more than the uppermost sheets. This slight proportional movement of successive sheets in the stack tends to equalize the distance that the respective sheets must be advanced by the separator rollers.

Vertical guards 223, only the left-hand one being shown, are secured to opposite sides of the platform to protect the separators or snaps when the paper tray is removed from the machine.

To align the leading edges of the sheets prior to the engagement of the snaps or separators thereon, there is provided a gate 231 pivotally mounted on rod 232 secured to depending legs on the left-hand end of the paper tray as seen in FIG. 21. Torsion springs 233 are mounted on the rod to normally bias the gate into a vertical position. A depending finger portion on the gate is positioned to engage a cam 234 secured to a bracket 235 extending between frame plates 10 and 11 so that when the paper tray is advanced to its operative position, as shown in FIG. 21, the gate is forced to swing downward, out of interference relationship with the sheets in the paper tray so that they may be advanced by the separator rollers 61 into the guide 67.

The fingers 219, the separators or snaps 214 and 215, are positioned to engage the gate 231. Thus, as the gate is biased by the torsion springs 233 into an upright position, the fingers are cammed up by the gate, automatically lifting the separators or snaps higher than the predetermined height of the stack of paper to be loaded. As the paper tray is advanced to its operative position, the gate 231 is lowered thereby dropping the separators or snaps onto the stack. The leading edge of the stack is originally aligned by the gate 231, but when the gate is lowered, the leading edge of the sheets will be held in alignment by the separators or snaps, as previously described.

A depending pin 236 is secured to the bottom front end of the platform, with respect to the machine, to pivotably support a disc 237. The disc 237 is yieldingly biased against the platform by spring 238 secured to the pin 236 by retaining ring 241 positioned in a suitable groove formed in the pin.

The stop stud 242, secured to the disc 237, extends through an arcuate slot formed in the platform concentric with the axis of pin 236. The stop stud is used as an adjustable stop against the trailing edge of the stack and as a compensating means for adjustment to various paper lengths.

Friction pads 243 and 244, usually made of rubberized cork or similar material, are suitably secured to the platform to prevent the bottom sheet of a stack from sliding before it is ready to be fed by the separator rollers.

To feed sheets of support material one at a time from the paper tray to the guide for pick-up by the sheet conveyor, there is provided a paper feeding and separating means comprising intermittently driven separator rollers 61 mounted on a driven shaft SH9. The shaft SH9 is journaled at one end in bearing 251 mounted in one end of an outboard arm 252 and the opposite end or inboard end of the shaft is free to float within vertical limits in an inboard arm 249. The opposite end of the arms 249 and 252 are suitably secured, as by welding, to torque tube 253.

A weight 248 on the inboard end of shaft SH9 provides a force equal to the force on the outboard arm 252 thereby equalizing the force of the separator rollers when feeding paper. This floating arrangement of the shaft permits automatic compensation for irregularities in the separator roller and associated components, and for differences in paper stack height thereby assuring constant friction contact between the separator roller and the topmost sheet. Constant friction of the separator roller on the topmost sheet prevents possible skewing of the paper sheet being fed and assures proper relationship of the leading edge of the paper sheet as it is advanced forward into the guide 67.

Shaft SH9 is driven from shaft SH8 by means of belt 256 which runs on pulleys 257 and 258 fixedly mounted on shaft SH8 and SH9, respectively. Shaft SH9 is held in the arms 249 and 252 by the pulley 258 secured to the shaft outboard of arm 252 and by a retaining ring 259 positioned in a suitable groove in the shaft outboard of arm 249.

Figure 8:
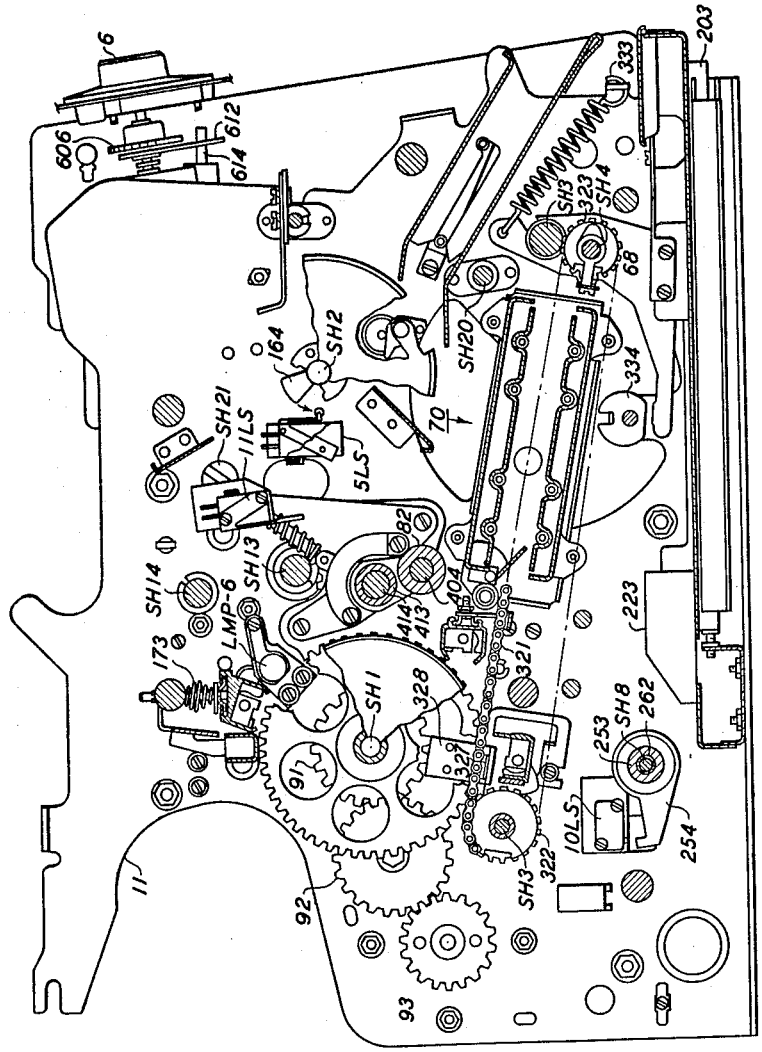
FIG. 8 is a sectional view taken along lines 8—8 of FIG. 4.

Shaft SH8 is journaled at one end in bearing 261 positioned in frame plate 10, and intermediate its ends by means of bearings 262 positioned within torque tube 253, as seen in FIG. 8, the torque tube being rotatably positioned by means of flanged bearing 263 mounted in frame plate 11, whereby either the torque tube or the shaft SH8 can be rotated with respect to each other.

The torque tube 253 encircling shaft SH8 is thus mounted about the axis of this shaft to be oscillated by lever 264 fixed thereon, so that separator rollers 61 are moved, by a control linkage described in detail hereinafter, from a first position out of contact with the sheets in the supply tray to a second position in which the separator rollers are moved in friction contact with the topmost sheet in the paper tray.

While the separator rollers are in contact with the topmost sheet, they are rotated in the direction shown by the arrow in FIG. 5, to separate the topmost sheet and forward it to guide 67. Shaft SH9, which supports the separator rollers, is operatively connected by means of the belt 256 to shaft SH8, as previously described. Shaft SH8 is intermittently driven by means of the pinion gear 266 secured thereon.

Referring briefly to FIG. 21, it is apparent that as sheets are fed from the stack, each successive sheet must be advanced proportionally a greater distance from the stack before its leading edge contacts the gate closing the egress opening of the guide 67. For reasons described in detail hereinafter, it is desirable to feed the sheets against the guide and to buckle the sheets so advanced, uniformly and without skewing.

Substantial uniform buckling of the sheets within the guide 67 is effected by means of a proportional paper feed mechanism. In this device, the shaft SH8 is rotated by the pinion gear 266 driven by an oscillating toothed quadrant. The toothed quadrant is oscillated by means of an arm having a cam follower thereon driven by a paper feed cam. The timing arrangement of this mechanism is such that rotation of the separator rollers to advance a sheet is accomplished while the separator rollers are resting on the topmost sheet of the stack. After the separator rollers are lifted off the stack, the toothed quadrant is returned to its normal position, for another sheet feed cycle, as determined by the null point of the paper feed cam or the height of the stack, causing the separator rollers to rotate in the reverse direction. Through a system of levers, an adjustable stop limits the return movement of the toothed quadrant as a function of the height of the stack in the paper tray. The result of this is that the period of duration of rotation of the separator rollers in contact with the paper is varied as a function of the height of the stack.

For rotating the pinion gear 266, there is provided a toothed quadrant 267 secured to shaft SH27 pivotally mounted in frame plates 11 and 12. The quadrant 267 is provided with teeth 268 at its lower end which mesh with the pinion gear 266.

The arm 271 fixed to shaft SH27 has a cam follower roller 272 rotatably mounted at one end. The cam follower roller 271 is actuated by paper feed cam 273 fixed to the drum shaft SH1, for oscillating the toothed quadrant 267. A spring 274 is connected at one end to stud 275 projecting from frame plate 12, and at its other end the spring is connected to the arm 271 to force the cam follower 272 toward the paper feed cam for engagement therewith.

The arrangement is such that upon each revolution of the paper feed cam 273, the spring 274 draws the arm 271 toward the right, as seen in FIGS. 32 and 34, causing rotary movement of the pinion gear 266 in a counter-clockwise direction, as seen in said figures, and that at another point in the revolution of the paper feed cam, the paper feed cam forces the arm 271 toward the left, as seen in these figures, to cause rotation of the pinion gear 266 in the opposite direction. Thus, upon rotation of the pinion gear 266, in one direction the separator rollers are driven in a clockwise direction for forwarding a sheet from the stack; and upon rotation of the pinion gear in the opposite direction, the rotation of the separator rollers is not effected to feed a sheet since they are raised by a roller control cam 281 and are therefore not in contact with the paper.

To effect feeding of a sheet as the separator rollers are rotated, the separator rollers are dropped into frictional contact with the topmost sheet of the stack in proper timed sequence with the actuation of the separator rollers for a feeding cycle.

This is accomplished by actuation of lever 264 fixed to torque tube 253 supporting the separator rollers. The lever 264 is pivotally connected to one end of cam lever 277. Cam lever 277 secured to shaft SH10 journaled in frame plates 11 and 12, is provided with a rotatably mounted roller 278 and a latch portion 279 at its upper end. The roller 278 is actuated by roller control cam 281 to oscillate the lever 264 to effect a lowering or raising of the separator rollers.

In order to resiliently force the roller 278 toward the cam surface of roller control cam 281, a coil spring 282 encircles a portion of shaft SH10. One end portion of the coil spring is received by a suitable aperture in frame plate 12 and the opposite end portion of the coil spring is received by an aperture in collar 283, which is adjacently held on shaft SH10 by a set screw 284.

It is apparent that the null portion or fall of the roller control cam is so formed that the cam follower 278 will only contact this portion of the roller control cam when the separator rollers are in contact with the platform of the paper tray. Thus, with a full stack in the paper tray the follower 278 will be prevented from contacting the null portion of the roller control cam due to the linkage between the follower 278 and the separator rollers, as seen in FIG. 32.

In order to increase or decrease the torque applied by the coil spring 282 on the shaft SH10 and, therefore to increase or decrease the frictional contact of the separator rollers on the stack, the set screw 284 is loosened and the collar 283 rotated in the proper direction for increasing or decreasing the spring tension and then the set screw is again tightened.

Adjustment lever 291, journaled on stop shaft SH30 secured to frame plate 11, is provided with a side extending leg portion positioned to be in interference relationship with the stop portion 269 of toothed quadrant 267 as it is moved clockwise as seen in FIG. 31. The adjustment lever is also provided with a depending leg portion having a stop screw 292 adjustably secured therein in position to contact the turned-out leg portion of link 276.

With this arrangement, the throw or angular displacement of the toothed quadrant, and therefore the number of gear teeth 268 engaging the pinion gear 266 during a feeding cycle, will be varied as a function of the stack height. As shown in FIG. 33, the movement of the toothed quadrant in a clockwise direction is limited by the rise of the paper feed cam 273, thus defining the limit of motion of the toothed quadrant in one direction. As shown in FIGS. 32 and 34, the effective position of the toothed quadrant at the start of an actual feed cycle is limited by the position of the extending leg portion of adjustment lever 291 as it contacts the stop portion 269 of toothed quadrant 267. The position of the extending leg portion of adjustment lever 291 is determined either by the height of the stack in the paper tray or the null portion of the roller control cam 281 through the control linkage described.

As shown in FIG. 32, the position of the toothed quadrant, when the separator rollers are in contact with the topmost sheet of a full stack, is such that only a portion of the teeth of the toothed quadrant will mesh with the pinion gear 266 during a feeding cycle whereas in FIG. 34, representing the position of the various elements when the separator rollers are in contact with the last sheet of a stack, the position of the toothed quadrant is such that all the gear teeth thereon will engage the pinion gear 266 during a feed cycle. With this driving arrangement, the rotational movement of the separator rollers is varied as a function of the stack height to effect proportional feeding of the sheets in the stack.

When the separator rollers are brought into contact with the topmost sheet in the supply tray and rotated in the direction shown, they will forward a sheet of support material into the guide 67 where its forward progress is stopped by the gate at the outlet of the guide. The separator rollers continue to rotate to feed the topmost sheet, causing the sheet to buckle in the guide for a purpose to be described in detail hereinafter.

Figure 20:
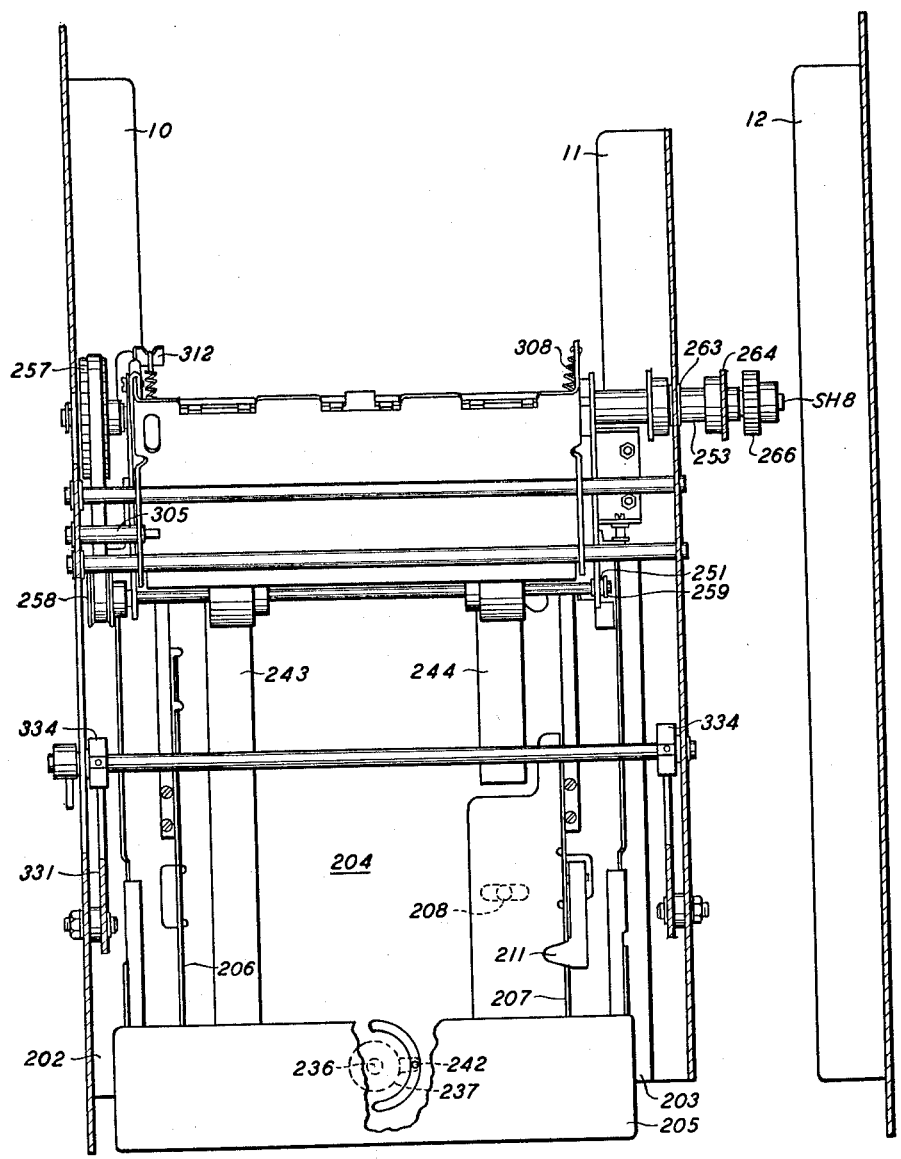
FIG. 20 is a top sectional view of the apparatus illustrating the paper tray assembly and paper guide mechanism.

Referring now to the guide 67, it includes an upper guide chute 301 having two upturned portions 302 and depending arms 303 formed integral therewith. The upper guide chute is supported by rods 304 secured to frame plates 10 and 11, the rods extending through suitable apertures formed in the upturned portions. Alignment of the guide between the frame plates is maintained by means of a spacer 305, as seen in FIG. 20. A lower guide chute 306 is secured to the upper guide chute to form with the upper guide chute a guide for the sheet material forwarded by the separator rollers. The trailing edges of these two chutes, are suitably notched to permit a gate 311 to be movably positioned to close the discharge end of the chute.

The gate is pivotally mounted on a gate rod 307 extending between and secured to the depending arms 303 of the upper guide chute and the gate is normally biased into position to close the discharge end of the chute by means of springs 308. The left-hand spring 308, as seen in FIG. 7, is secured at one end to the gate and at its opposite end to the left-hand depending arm 303 of the upper guide chute. The right-hand spring 308 is secured at one end to the gate and at its opposite end to a clamp 312 secured to the right-hand depending arm, as seen in FIG. 7. As seen in FIG. 22, the upper portion of the gate 311 has bent closure members formed thereon adapted to rest, when biased by the springs 308 against the trailing edges of the upper and lower guide chutes to close the egress opening formed by these guide chutes. The closure members extend beyond the upper guide chute to be in interference relationship with a paper gripper 63 as it passes thereover, so that the gate is actuated by a paper gripper to release a sheet thereto.

The gate is also adapted to be opened by a lever 313 journaled intermediate its ends on stud shaft 314 fixed to a depending arm of the lower guide chute. The lever is normally biased by coil spring 315 in a counterclockwise direction, as seen in FIG. 21, to open the gate. The coil spring 315 encircles stud shaft 314 and is held thereon by retaining ring 316. One end portion of the coil spring butts against the bottom of the lower guide chute. The opposite end portion of the coil spring is hooked over the lever. The force of coil spring 315 is sufficiently great to overcome the biasing action of springs 308, whereby the gate may be opened by the lever.

However, during machine operation, the lever is moved out of engagement with the gate, against the biasing action of spring 315, whereby the gate will be actuated by a paper gripper.

When the paper tray is moved into its operative position, as shown in FIG. 21, the gate 231 of the paper tray is forced open whereby it will contact the lower portion of lever 313 to shift the lever clockwise out of engagement with the gate 311. If the paper tray is removed from the machine, the gate 231 will be removed from contact with the lever to allow it to be moved counterclockwise by the action of the coil spring 315 to open the gate 314.

A sheet of support material, such as paper, forwarded by the separator rollers to the guide 67 is forwarded from the guide by endless conveyor 62 to the xerographic drum adjacent to corona transfer device, whereat a xerographic powder image previously formed on the drum is transferred from the drum to the sheet. The sheet is then forwarded by the conveyor to the heat fuser 70 whereat the powder image on the sheet material is permanently fused thereon, and then to the set of delivery rolls 65 and 66 which deliver the sheet of support material from the machine.

The conveyor 62 includes two endless roller chains 321 which pass from a set of drive sprockets 322 carried by shaft SH3 to, and around, a set of sprockets 232 on shaft SH4 which guide the chains in a path tangential to the surface of the xerographic drum. These two sets of sprockets are fixedly positioned on their respective shafts to space the chains apart from each other by a distance greater than the length of the drum to afford complete use of the xerographic drum plate surface.

In the embodiment of the conveyor apparatus shown, the two paper grippers are equally spaced from each other along the length of the chains, and are positioned on the chains at right angles to the path of travel of the chain for movement therewith in a circuit between sheet receiving and sheet delivery stations identified, respectively, as the output of the guide 67, and the delivery rollers 65 and 66.

Means are provided at these stations to cause the paper grippers to take hold of the front or leading edge of a sheet of support material at the receiving station, that is, from guide 67, and to hold this sheet while traveling to the delivery station and there to release the sheet for discharge by the delivery rollers from the machine.

Two paper grippers are used in the preferred embodiment of the machine so that as one paper gripper is moved from the receiving station carrying a sheet of transfer material to the delivery station, the other paper gripper will move from the delivery station to the receiving station to be in position to receive the next sheet of support material.

Conveyor shaft SH3, carrying the drive sprockets 322, is journaled in the frame plates 10 and 11 to ensure synchronized movement of a sheet of support material with the xerographic drum to effect registered transfer of the powder image from the drum to the sheet material, the chain conveyor is driven by the sprocket 27 fixed to the xerographic drum. The sprocket 27, secured to the drum shaft SH1, is positioned thereon to drive by the left-hand chain 321, as seen in FIG. 19, that is, the chain nearest frame plate 11. The pitch diameter of the sprocket 27 is equal to the diameter of the drum so that the linear surface speed of the drum is equal to the speed of travel of the chain of the sheet conveyor, as represented by the pitch line of the chain. To insure effective engagement of the chain 321 with the sprocket 27 there is provided a guide 327 positioned adjacent to the sprocket by means of a bracket 328 secured to plate 11 which forces the chain into driving relation with the sprocket. The guide 327, formed in the shape of an inverted T, is positioned so that the chain is guided into contact with the sprocket 27, with the pitch line or center of the chain moving in a path tangentially to the pitch line diameter of the sprocket 27 to ensure positive contact between the chain and the sprocket and to eliminate the possibility of any backlash occurring between the chain and the sprocket.

Shaft SH4, carrying sprockets 323 thereon, is suitably journaled at its opposite ends in a left-hand conveyor support 331 and a right-hand conveyor support 332 pivotally secured by means of stub shaft SH26 to frame plates 10 and 11, respectively, whereby the shaft SH4 can be oscillated in an arc about the axis of the shoulder screws from a first position in which tension is applied to the chains of the conveyor, to a second position in which the chains are slackened sufficiently to either permit replacement of a chain or removal of the xerographic drum from the machine.

Springs 333, connected at one end to a conveyor support and at their other end to a frame plate, are used to normally bias the conveyor supports in a clockwise direction, as shown in FIG. 19, to maintain the chains of the conveyor mechanism in tension. To permit an operator to release the tension on the chains, to permit replacement of a chain or to permit removal of the xerographic drum, there is provided a pair of cams 334 fixed to a cam actuator shaft SH22, suitably journaled in frame plates 10 and 11, by means of which an operator can rotate the conveyor supports in a counterclockwise direction as shown in FIG. 19, against the biasing action of the spring to release the tension on the chains. The cam actuator shaft SH22 is provided with a multi-sided end portion extending beyond frame plate 10 adapted to receive a suitable wrench by means of which the operator can rotate the cams.

A paper guide roll 335, having D-shaped rolls 366 formed thereon, is mounted on shaft SH3 to guide the trailing end of a sheet carried by a paper gripper. The paper guide roll, as seen in FIG. 7, is provided with a torque portion forced into driven engagement with the groove hub portion of a sprocket 322 by means of a spring 337.

A set of delivery rolls 66 similar to D-shaped rolls 336, are fixed to shaft SH4 for rotation therewith, these rolls cooperating with the delivery roll 65 to feed sheets of support material from the machine. The delivery rolls 65, preferably made of rubber or similar material, are mounted for rotation therewith on idler shaft SH23 journaled at opposite ends in inclined slots formed in the left-hand and right-hand conveyor supports.

In the embodiment shown, the paper grippers are positioned to grip the leading edge of a sheet of support material in position to travel substantially along the pitch line of the chain, and of course, as the sheet travels around the sprockets 322 and 323 the leading edge of the sheet will travel in a path equal to the pitch line of the sprockets. As previously described the linear speed of travel of the paper gripper as carried by the chain is equal to the peripheral speed of the xerographic drum, and the sheet of support material is pulled by its leading edge to and from the drum at a constant rate whereby it is prevented from slipping with respect to the peripheral surface of the drum.

However, since a straight line path of travel of the support material to and from the drum cannot be accomplished by a conveyor of the length shown, the radius of the peripheral surface portion of the D-shaped rolls 336 and the delivery rolls 66, in the embodiment shown, is made equal to the pitch radius of the sprockets 322 and 323 to permit the sheet material to be guided around the axis of the shafts SH3 and SH4, respectively, in a path corresponding to the path of the paper grippers. In this manner, the trailing edge of the sheet support material is guided by the paper guides in a path corresponding to the path of travel of the paper grippers about the shafts SH3 and SH4 at a linear speed equal to the speed of travel of the paper grippers. The rise of the chord of the D-shaped rolls 336 and the delivery rolls 66 is such that the chord surface of each of the rolls is positioned below the path of travel of the paper grippers, or stated in a different manner, the rise of the guides is slightly greater than the distance from the center line of the chain to the bottom of the paper grippers. The length of the chains and the spacing of the shafts SH3 and SH4 are so chosen so as to permit the D-shaped rolls 336 and delivery rolls 66 to be fixed on the shafts SH3 and SH4 for rotation therewith, so that the paper grippers as they approach the D-shaped paper guides will mate with the chord portion of these guides for corresponding movement of these elements.

End play of the shaft SH3 is eliminated by means of a spring 344 encircling the shaft, butting at one end against the sprocket 322 and at its other end against a spring stop 345. In a similar manner, the end play of shaft SH4 is eliminated by the biasing action of a spring 344 encircling this shaft. Since both of the grippers 63, used in the machine are of like construction, for simplicity, only one will be described herein.

As shown in detail in FIGS. 25 through 29, inclusive, a paper gripper 63 consists of a gripper bar bracket 351 of a length to extend substantially between the two roller chains 321 to be connected thereto by means of clips 354 forming part of the chains when connected thereto, as is well known in the art. The gripper bar bracket 351 is formed to support the gripper bar so that the top surface of the gripper bar is positioned slightly below the pitch line of the chains, whereby the gripper bar, as it passes beneath the xerographic drum, will not jam against the peripheral surface of the xerographic drum.

A sheet gripper jaw 355, which may be a separate element fixed to the gripper bar bracket, as shown, or formed integral therewith, extends across the rear of the gripper bar bracket (in terms of the direction of travel of the gripper bar). The sheet gripper jaw 355 is positioned to have surface contact with the leading edge of a sheet of support material as it is advanced from the paper guide 67. The sheet gripper jaw cooperates with the tang portions or jaws 362 of the grippers 361 to grip a sheet of support material inserted therebetween.

Each of the grippers 361 is mounted by means of a pin 371 suitably secured to the leading edge of the gripper bar bracket, for movement in two directions relative to the fixed sheet gripper jaw 355; that is, for movement from a first position in which the tangs or jaws of the gripper are in spaced relation to the sheet gripper jaw 355 to receive a sheet of support material therebetween, and for movement to a second position in which the tangs or jaws of the gripper are in engagement with the sheet gripper jaw or with a sheet of support material sandwiched therebetween.

Each gripper is provided with a depending guide portion or tang 363 terminating in a curved lip portion 364 which is slideably received in suitable elongated slots 356 and 352 formed in the sheet gripper jaw and gripper bar bracket, respectively. The guide portion or tang 363 serves as a guide or stop for the leading edge of a sheet and also as a lever by means of which the gripper is actuated.

The tang portions or jaws 362 of a gripper 361 are normally biased into contact with the sheet gripper jaw 355 or with a sheet therebetween by means of a spring 365. Each spring 365 is formed with a central portion 367, coiled portions 366 on the opposite sides of the central portion, and with bent arms 368 at opposite extremities thereof. Each spring is mounted with its coiled portions 366 encircling a pin 371 on opposite sides of the gripper with which it cooperates, the central portion of the spring engaging the curved lip portion of the gripper and with the bent arm portions extending through suitable apertures 357 and 353 in the gripper jaw and gripper bar bracket, respectively, to engage the underside of the gripper bar bracket.

Referring now to FIGS. 5 and 19, a sheet of support material, such as paper, forwarded into the guide 67 by the action of separator rollers 61 contacts the gate 311 of the guide, and as the separator rollers continue to advance the sheet, the sheet is buckled. As a paper gripper advances over the guide 67, the gate 311 will be forced open as the paper gripper strikes it, and at the same time the depending guide portion and curved lip portion of the grippers will strike a cam 68 to open the jaws of the paper gripper to receive the paper from the guide 67. Because of the slight bucket in the sheet and because, at this time the separating rollers are still attempting to advance the sheet, the sheet as it unbuckles will be forced between the jaws of the paper gripper. As the depending guide portion and curved lip portion of the grippers slide off the cam 68, the jaws will close by the biasing action of the spring 365 to grip the sheet and forward it to the delivery station of the machine. The cams 68, fastened to cam support 381 adjustably secured to frame plates 10 and 11, are positioned directly above the gate 311 of guide 67.

At the delivery station, the paper gripper carrying a sheet will pass between the delivery rollers 65 and 66 and as it does so, the grippers are again actuated by means of cam 69 mounted on bracket 382 fastened to the shoulder portion of the left-hand and right-hand conveyor supports, thereby releasing the sheet from the paper gripper for discharge by these rollers from the machine. As the sheet is advanced by the delivery rollers 65 and 66, it is guided from the machine by means of the previously described cover plate 205 on paper tray 60.

*Plate Cleaning Assembly*

To remove any residual powder that may remain on the xerographic plate after the transfer process, there is provided a plate cleaning assembly, and to dissipate any residual electric charge remaining on the plate a light source is used to flood the portions of the xerographic plate with light as it passes through the cleaning station.

Although any suitable cleaning mechanism may be used to remove powder particles remaining on the drum after the transfer process, the cleaning apparatus used in the preferred embodiment of the xerographic reproducing apparatus shown is a web cleaning apparatus.

As shown, the web cleaner 80 includes a supply roll 81, preferably formed as a disposable cardboard cylinder, carried on supply roll shaft SH14 journaled in frame plates 11 and 12. The supply roll is held on the supply roll shaft by means of a spring snap retainer 401 secured to the free end of the shaft, the slotted end of the supply roll engaging the pin 402 in the shaft. As web material 403 is pulled from the supply roll, the shaft SH14 must be rotated, thereby imparting a slight resistance to the unwinding of web material from the supply roll.

The web material 403, is brought into cleaning contact with the drum surface by cleaning or pressure roll 82, preferably made of rubber, bonded to a support cylinder 404. Cylinder 404 is supported at opposite ends by stub shafts 405 and 406 journaled in yokes 411 and 412, respectively, fastened in spaced apart relation to each other on torque tube 413. The cleaning or pressure roll is driven by pin 407 on one end of stub shaft 406 engaging the notched end of cylinder 404, a driven gear 408 being fixed to the opposite end of the stub shaft.

The torque tube 413 is rotatably supported on yoke shaft 414 which is fastened at one end by set screw 415 in support 416 secured to frame plate 11. At its outboard end, the torque tube is journaled on tapered pin 419 in support arm 417 pivotally mounted by pin 418 to bracket 421 secured to frame plate 10. Support arm 417 is normally biased into position to support the outboard end of torque tube 413 by means of coil spring 422 and is locked into support position by means of a suitable fastener 447, such as a 15F Series, Push Button Fastener, marketed by Camloc Fastener Corporation, Paramus, New Jersey.

The torque tube 413, carrying the cleaning or pressure roll 82, is thus adapted to be rotated about the axis of yoke shaft 414 from a first position, as shown in FIG. 5, with the cleaning roll in operative position against the peripheral surface of the xerographic drum with the web material sandwiched therebetween, to a second position, as shown in FIG. 8, in which the cleaning roll is in an inoperative position away from the surface of the xerographic drum.

The cleaning roll is biased into pressure contact with the peripheral surface of the xerographic drum by means of compression spring 423. The compression spring 423 encircles the link 424 extending radially from shaft SH21, journaled in frame plates 11 and 12.

One end portion of the compression spring engages the shoulder on the lower end of link 424 and the opposite end portion of the compression spring engages the shaft SH21.

Link 424 is movably mounted at one end in a suitable opening in shaft SH21 and its movement in one direction is limited by washer head screw 445 adjustably threaded into the end of the link. With this arrangement the axis of the cleaning roll is biased by the compression spring 423 to a fixed position relative to the peripheral surface of the xerographic drum as determined by washer head screw. The normal force applied by the cleaning roll against the xerographic drum surface with the web material sandwiched therebetween is dependent on the spring rate or deflection of the material of the cleaning roller and the position of the axis of the cleaning roller relative to the xerographic drum as determined by the washer head screw 445 acting as a stop for link 424.

It has been found that effective cleaning is obtained when the normal force of the pressure or cleaning roll against the xerographic drum with the web material therebetween is in the range of ten to thirty pounds, preferably 20 pounds.

The link 424 and the compression spring act as an overriding linkage permitting the compression spring to either bias the cleaning roll against the peripheral surface of the drum that is, to bias the axis of the cleaning roll to a fixed position or to bias the cleaning roll away from the drum to its inoperative position.

To permit an operator to rotate the torque tube to move the cleaning roll to either its operative position or its inoperative position, the torque tube is formed, near its outboard end, with multi-sided flats adapted to receive a suitable wrench. Angular displacement of the torque tube is limited by means of retainer plate 428 secured to switch bracket 429, in position to limit the movement of yoke 412.

The cleaning roll 82 is rotated by the gear 408, on stub shaft 406, engaging the compound gear 431 journaled on yoke shaft 414, axial alignment of this gear being maintained by spacer 434. Compound gear 431 in turn is driven by compound gear 91 on the drum shaft SH1 through pinion gear 432 and compound gear 433. Pinion gear 432 and compound gear 433 are mounted on stub shafts 435 journaled in front support plate 436 and rear support plate 437.

Switch bracket 429, front support plate 436 and rear support plate 437 are mounted on studs 438 secured to support 416. The switch bracket is maintained in spaced relation to the front support plate by spacers 441 and the front support plate is held in spaced relation to the rear support plate by spacers 442.

The take-up roll 83, preferably formed as a disposable cardboard cylinder similar to supply roll 81, is positioned on takeup shaft SH13 by a spring snap retainer 401 secured to the free end of the shaft, the slotted end of the take-up roll engaging the pin 402 in this shaft.

Take-up shaft SH13, journaled in frame plates 11 and 12 is driven by compound gear 433 and driving gear 451 journaled on the shaft through a slip clutch arrangement in which the end face of gear 451 adjacent the torque nut 452 serves as one clutch element coacting with the second clutch element or torque nut 452 adjustably positioned on the shaft by torque screw 453 and set screw 454. This assembly is secured against rotation relative to the take-up shaft by engagement of the radial pin 455, carried by this shaft, with the slot provided in the torque screw.

In order to provide means for applying the required pressure to the coacting clutch elements, gear 451 and torque nut 452, a pair of annular springs 456 encircle the shaft between the gear 451 and thrust washers 457 and 458 retained by snap ring 461 positioned in a suitable groove formed in the take-up shaft.

The torque nut 452 is adjusted on the torque screw so that the force applied by annular springs 456 is sufficient to permit the gear 451 to drive the take-up shaft through torque nut to rewind the web material onto the takeup roll as it is advanced by the cleaning roll cooperating with the drum surface, while still permitting these clutch elements to slip relative to each other whereby the desired range of tension on the web material is maintained. In this manner the web material is advanced only by the action of the cleaning roll and not by the take-up roll.

With this arrangement the web material is advanced by the cleaning roll at a speed relative to the lineal speed of the drum surface whereby the web material will wipe the residual powder that may remain on the xerographic plate after the transfer process.

*Fuser*

The developing material used to form the powder images are specifically chosen to permit them to be fixed to the support material either by heat fixing or vapor fixing techniques, that is, the individual particles of resin (toner) soften and coalesce when heated, or plasticized by solvent, so that they became sticky and readily adhere to the support material. Although any suitable fixing device may be used, in the embodiment shown, a heat fuser of the type disclosed is preferred.

Referring now in particular to the illustrations of the fuser, there is shown a preferred embodiment of a heat fuser 70 including a bottom radiant heating panel 501 and a top radiant heating panel 521 mounted in a bottom housing 502 and a top housing 522, respectively, positioned in the machine in spaced apart relation to each other to permit a sheet of support material, carrying an unfused powder image thereon, to be transported between the radiant heating panels for the purpose of heat fixing the powder image onto the support material.

The bottom housing 502 includes a base plate 503 having formed integrally therewith side walls 504 extending along the length of the base plate, end walls 505 and end portions 506 along the ends of the base plate. The bottom housing forms an enclosure for the bottom radiant heating panel 501 which is thermally insulated from the base plate of the housing by an insulator 507, such as a mat of fiber glass, positioned between the base plate of the housing and the radiant heating panel.

The bottom housing is secured to frame plate 11 by means of an angle bracket 508 fastened to the end of portions 506 of the bottom housing and the radiant heating panel, the opposite end of the angle bracket being secured to a support plate 511 supported by pins 518 on frame plate 11. At its opposite end the bottom housing is secured to spacers 512 mounted on angle brackets 513 fastened to a lower support plate 514 secured to frame plate 10.

Strips of insulating material 515 are secured to the bottom plate by means of suitable cement material.

Paper guides or supports, such as wire grids 516 are secured to opposite ends of the radiant heating panel to extend across the top of the radiant heating panel to prevent a sheet of support material from coming into direct contact with the radiant heating panel.

The top housing 522, similar in construction to the bottom housing, includes a top plate 523 having formed thereon depending side walls 524 extending along the length of the top plate, and depending end walls 525 and end portion 526 extending along the sides of the plate. The top housing forms an enclosure for the top radiant heating panel 521, thermally insulated from the top plate by an insulator 507 positioned between the top plate and the top radiant heating panel.

The top housing 522 is mounted to frame plate 11, by angle brackets 508 and a support plate 527 in the same manner as the bottom housing 502. At its opposite end, the top housing is secured to spacers 512 mounted on angle brackets 513. Angle brackets 513 are fastened to top support plate 528 secured to frame plate 10. A blanket of insulating material 517 is secured to the top surface of the top plate 523 by means of a suitable cement material.

Each radiant heating panel includes a metal platen 531 formed with circular grooves extending across the length of the platen in substantially parallel relation to each other. Tubular heating elements 532 are secured, as by brazing, in each of the circular grooves.

Each tubular heating element includes a coiled nickel-chromium resistance wire, not shown, compacted in a dielectric material which is enclosed by a metal sheath. The metal platen and the exposed portions of the tubular heating elements are coated with a suitable ceramic material, such as ceramic frit, having a minimum emissivity of 0.95.

Figure 48:
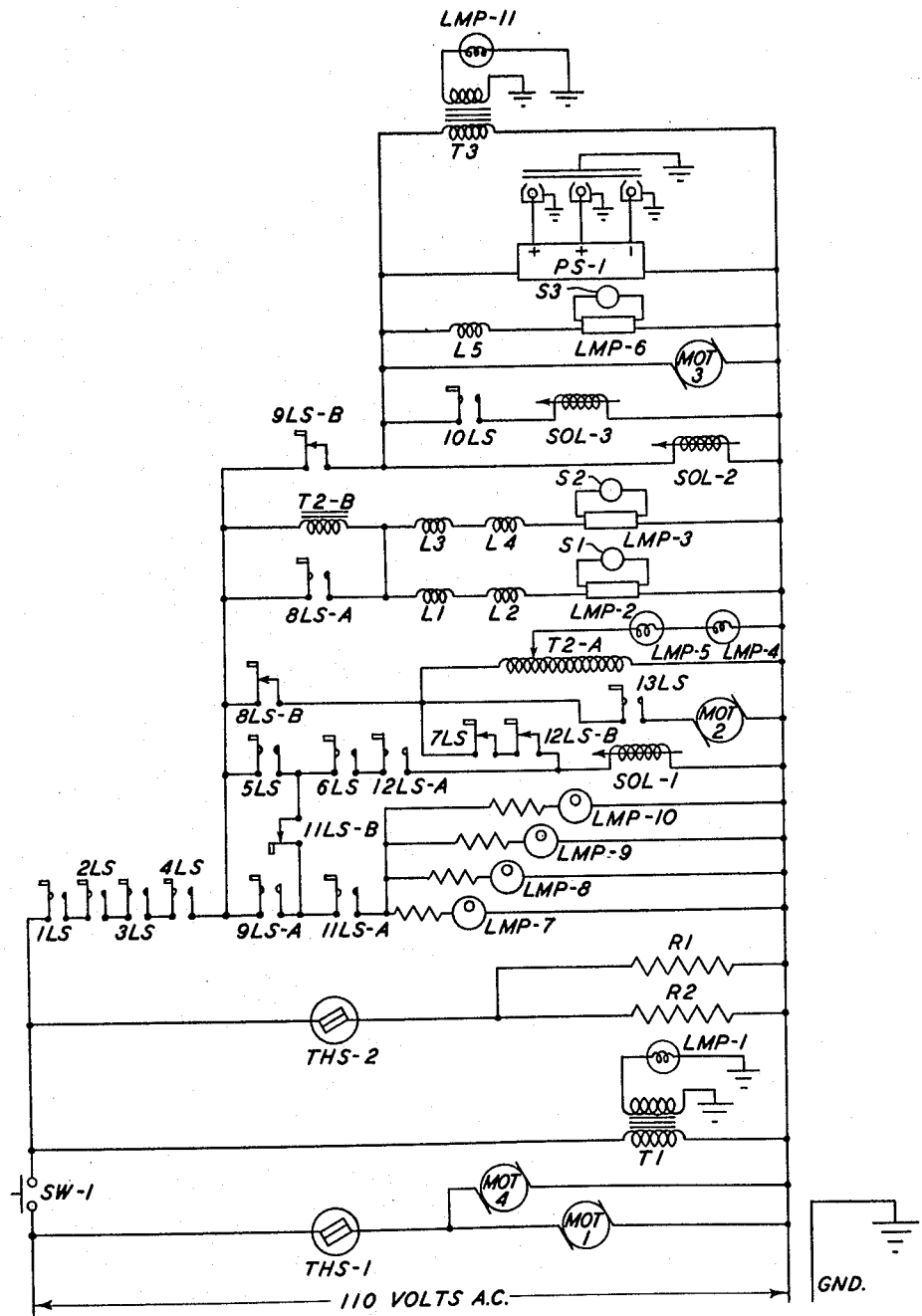

The tubular heating elements in a panel are connected to each other at one end by a conductor 534 fastened to the terminal pins 533 extendings from the metal sheaths, and at the opposite ends the tubular heating elements are connected in pairs to terminal blocks 535 thereby forming unitary resistance elements R1 and R2 for the top and bottom heating panels, respectively, which are connected to a source of power, as shown in FIG. 48.

To conserve heat within the fuser and to limit heat transfer by convection from the heat fuser to the xerographic drum, the opening in the fuser nearest to the xerographic drum is provided with a gate 541 to partly close the opening between the bottom and top radiant heating panels when the fuser is being operated on a stand-by basis. When the xerographic apparatus is in operation, the gate is opened to permit a sheet of support material to be transported to the fuser by the sheet conveyor mechanism.

The gate 541 secured to a crank rod 542 is pivotally supported by the crank rod journaled in brackets 543 secured to the top radiant heating panel 521. Cut out portions 544 are provided in the gate for the passage of the endless chains of the sheet conveyor.

Figure 41:
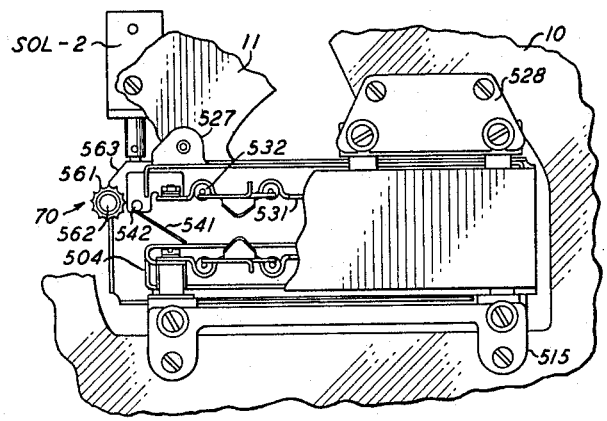
FIG. 41 is a left-hand side view of the heat fuser used in the apparatus.
Figure 44:
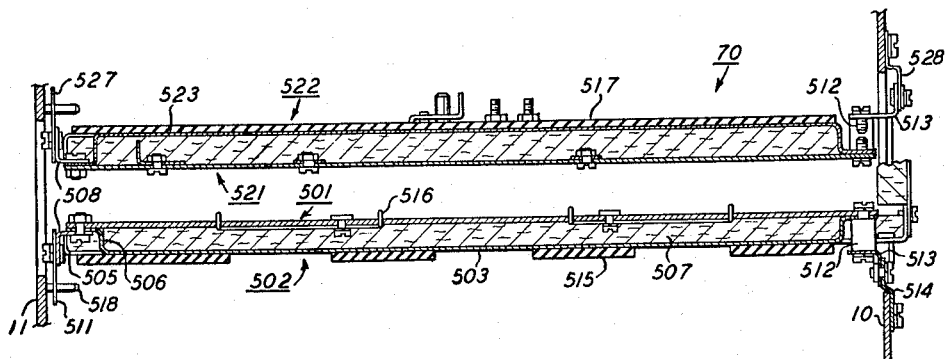
FIG. 44 is a sectional view of the heat fuser taken along line 44—44 of FIG. 42.
Figure 46:
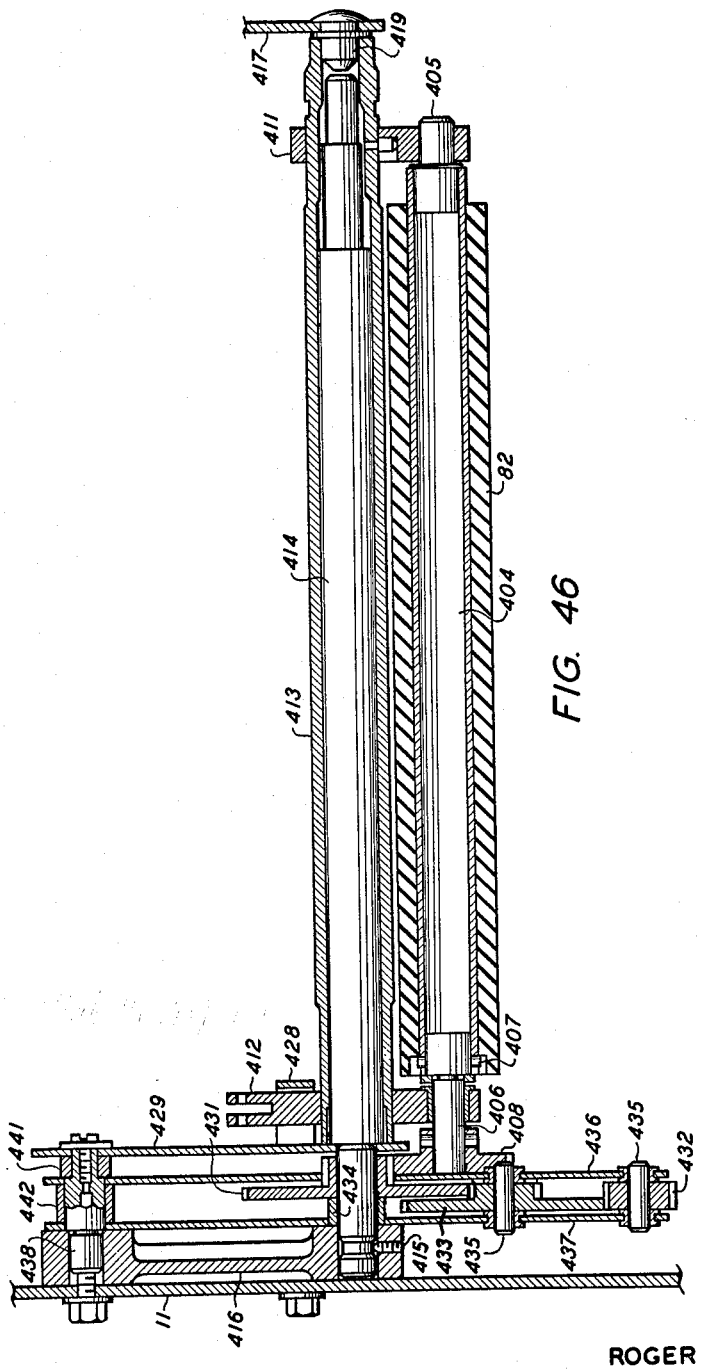
FIG. 46 is a sectional view of the web cleaning roll drive mechanism of the web cleaner apparatus.

In normal operation, the gate is opened by means of a solenoid SOL2 mounted on solenoid bracket 454 secured to the back side of plate 11. A lever 546 is connected at one end by pin 547 to the normally extended armature or plunger of the solenoid and at its other end to the crank rod 542 to actuate the gate. When the solenoid SOL2 is actuated, its plunger is retracted to actuate the crank rod to rotate the gate inward or counterclockwise, as seen in FIG. 41, toward the top radiant heating panel, this movement being in the direction of travel of the sheet conveyor. A solenoid having a normally extended armature or plunger is used in the preferred embodiment, so that if the solenoid fails to operate, the gate will still be opened by a paper gripper 63 of the sheet conveyor mechanism 62. As a paper gripper is advanced it will strike the gate to force it open as the sheet gripper travels into the fuser.

In the embodiment shown, the frame plate 10 is provided with a suitable opening through which the fuser assembly is inserted into the machine. To eliminate heat loss from this end of the fuser, a closure plate 551 carrying an insulator pad 552 is secured to the bottom and top housings.

Power to the fuser is controlled by means of a conventional thermostat THS1 inserted through suitable apertures in insulating material 517, top plate 523 and insulator 507, the thermostat being fastened by a mounting bracket 553 secured to the top radiant heating panel 521.

The radiant heating panels are suitably connected to a source of electric energy, in parallel with each other, but in series with the thermostat, to permit the thermostat to control the amount of electrical energy supplied to the radiant heating panels.

To guide the trailing edges of a sheet of support material conveyed through the fuser by a paper gripper, there is provided at the front of the fuser, as determined by the direction of the traveling of the paper gripper, a pair of paper hold down wheels 561. Each of the paper hold down wheels, in the form of a starwheel, is rotatably mounted on a pivot 562 secured to a wheel bracket 563. The wheel brackets 563 are secured to the top radiant heating panel 521 to position the paper hold down wheels 561 in front of the opening into the heat fuser and slightly above the paper grippers as they advance toward the fuser.

Machine Operation

The xerographic drum is rotated at a constant speed by a compound gear 91 fixed to the drum shaft SH1 carrying the xerographic drum, by a main drive motor MOT3. Compound gear 91 engages compound idler gear 92 which is driven by gear 93 fixed to the shaft of the main drive motor MOT3. The bucket-type conveyor and the toner dispenser of the developing apparatus 50 are suitably driven by a motor MOT2, shown schematically in FIG. 48. Suitable blowers, not shown, driven by motors MOT1 and MOT4 are used to dissipate heat, generated by the fuser and projection lamps, from the machine.

In the average office, it is generally necessary to make, at random intervals through the day, a single reproduction of an original, multiple reproductions of an original, or successive reproductions from successive originals.

To make a single reproduction, a copy is inserted into the machine through document guide 37 into contact with the copy drum 30. The copy is advanced through the document guide 37 until its forward progress is stopped by the document stops 107 and in this position the document is maintained against the peripheral surface of the copy drum by document retainer 108, whereby the operator can release the copy.

As the document is inserted in the document guide, its leading edge will actuate limit switch 6LS, positioned beneath the document guide with its actuator extending through a suitable aperture in the document guide, to thereby close its contact to complete a circuit to initiate operation of the machine. That is, at this time the main drive motor MOT3 is energized to rotate the xerographic drum 20, the copy drum 30 and the sheet conveyor mechanism 62. Motor MOT2 is also energized to effect operation of the developer mechanism 35 and toner dispenser 37. Solenoid SOL2 is energized to open the gate of the heat fuser 70.

At the exposure station, the exposure lamps are energized; that is, fluorescent lamps LMP2 and LMP3 are energized through their circuits, consisting of ballast L1, L2 and L3, L4, and starters S1 and S2, respectively. Lamps LMP4 and LMP5 connected in series with each other are energized through the conductor line connected to the secondary of transformer T2A also energized at this time. The discharge lamp 85, a fluorescent lamp, LMP6 as shown in the circuit drawing is energized through its circuit consisting of ballast L5 and starter switch S3. Power is also supplied to the high voltage power supply PS1 to effect operation of the corona charging device 21, the corona transfer device 64 and the corona pre-cleaning device 84.

Now as the xerographic drum 20 rotates under corona charging device 21, a uniform electrostatic charge is deposited on the photoconductive layer of the drum. As the xerographic drum rotates through the exposure station a light or radiation pattern of the copy carried on the rotating copy drum 30 is projected, by means of the mirror and lens assembly previously described, onto the surface of the drum to dissipate the charge on the drum in accordance with the light or radiation pattern of the copy, thereby forming a latent electrostatic image of the copy on said xerographic drum.

The exposed portion of the drum then rotates to the developing station C, where a xerographic developing material including toner particles having an electrostatic charge are cascaded over the drum surface whereby the toner particles adhere to the electrostatic latent image to form a xerographic powder image in the configuration of the copy. The exposed and developed portion of the xerographic drum then advances to the image transfer station D where it receives a sheet of support material advanced by the separator rollers 61 and transported into contact with the drum by the sheet conveyor. As the drum surface and sheet of support material pass over the corona transfer device 64, the developed powder image is transferred electrostatically from the xerographic drum surface to the sheet of support material. The xerographic drum then continues to rotate past the precleaning corona device 84, then to the web cleaning device whereat any residual powder on the drum surface is removed by the web, and then under the discharge lamp whereat any residual charge on the drum is dissipated by radiation from this lamp.

In the meantime, the copy drum has rotated at a corresponding rate of speed whereby it will have rejected any copy, if the interposer pin is in position to cause the ejection of copy, and the copy drum is then ready to receive a second copy, or if the copy is to be retained on the copy drum, it is ready to be advanced through the exposure station again. Assuming that only a single reproduction of a single copy is being made, the copy will have been ejected from the machine and the xerographic powder image will be transferred to the sheet of support material during the one cycle of rotation of the xerographic drum and copy drum. However, at this point in the operation of the apparatus the sheet of support material, with the powder image transferred thereto, has not been ejected from the machine.

The operating cycle of the apparatus disclosed is such that it requires three cycles of rotation of the xerographic drum and the copy drum to effect one and one-half cycles of rotation of the sheet conveyor mechanism. In the embodiment of the apparatus shown, the pitch length of the chain of the sheet conveyor is twice the circumference of the xerographic drum, so for three revolutions of the xerographic drum the chain makes one and one-half revolutions.

Thus, after the transfer step, even though a second reproduction is not to be made, the xerographic drum and the copy drum must rotate through a second and third revolution to permit the sheet conveyor mechanism to eject a sheet of support material from the machine. However, during the second and third revolution of the xerographic drum and the copy drum, still assuming that only a single reproduction is being made, the optical system will, in effect, scan a blank copy drum and project a radiation image from the copy drum onto the xerographic drum, to expose the xerographic drum to this image of the copy drum. The xerographic drum will then again pass through the developing station and through the transfer station as previously described; however, a latch mechanism has now engaged the cam lever 277 to prevent advancement of a sheet of transfer material from the paper tray to the xerographic drum. As the xerographic drum continues to rotate through the second and third cycle it will again be cleaned as it passes through the cleaning station E and thus made ready for an actual reproducing cycle.

The continued operation of the sheet conveyor, copy drum and xerographic drum is effected by means of a time out cam which, when actuated by the latch mechanism, operates in time sequence to the rotation of the xerographic drum so that sufficient time is allowed to permit the xerographic drum to rotate through the required cycles before the main drive motor is de-energized, thereby enabling the sheet conveyor mechanism and the delivery rollers, to eject the reproduction from the machine.

As shown in FIGS. 30, 38, 39 and 40, the time out cam 630 is mounted on shaft SH11 journaled in frame plates 11 and 12. The time out cam is journaled on shaft SH11 for rotation relative to the shaft and is maintained axially thereon by a retaining ring 645 positioned in a suitable groove formed on the shaft. Shaft SH11 is operatively connected to drum shaft SH1 by belt 96, which runs on pulleys 95 and 94, fixedly mounted on shafts SH11 and SH1, respectively, whereby the shaft SH11 is rotated at approximately one-third the rotative speed of shaft SH1.

The time out cam is provided on one face thereof with cam surfaces 632 formed concentric with each other, these cam surfaces being used to actuate a multi-copy delivery limit switch 12LS and a main drive limit switch 9LS, respectively. On its peripheral surface adjacent to these cam surfaces, the time out cam is provided with a cam surface 633 adapted to actuate a limit switch 8LS for a purpose to be described hereinafter. Limit switches 9LS and 12LS are mounted on support 646 and limit switch 8LS is mounted on support 647, both supports being secured to frame plate 11.

The time out cam is rotated, during the timing out cycle, in the same direction and in synchronism with the drum shaft by the clutch slide 640 mounted on shaft 11. The time out cam and the clutch slide form a dog clutch, that is, the clutch slide is provided with a lug 641 adapted to engage one of the slots 634 formed on the raised annular inner portion of the time out cam, and the clutch slide is slidable axially on shaft SH11 for engaging the time out cam.

The clutch slide 640 is secured for rotation with shaft 11 by engagement of radial pin 644, carried by the shaft, with the longitudinal slot 642 provided in the hub end of the clutch slide. Clutch slide 640 is provided with an annular groove 643 adapted to receive the latch lever of the latch mechanism, described hereinafter, whereby the clutch slide may be selectively moved into or out of engagement with the time out cam.

To effect rotation of the time out cam in the opposite direction, there is provided a return spring 651 encircling the hub of the time out cam. One end of the return spring is received by an opening in frame plate 11 and the opposite end portion of the return spring is received by a suitable opening in the time out cam.

It is noted that the size of the return spring is such that, when the spring is in its normal expanded condition, it may be contracted when the time out cam is rotated in a counterclockwise direction, as seen in FIG. 10, whereby sufficient energy is stored up by the spring to rotate the time out cam in a clockwise direction when the drive force, i.e., the clutch slide 640, rotating the return spring in a counterclockwise direction is released.

Figure 39:
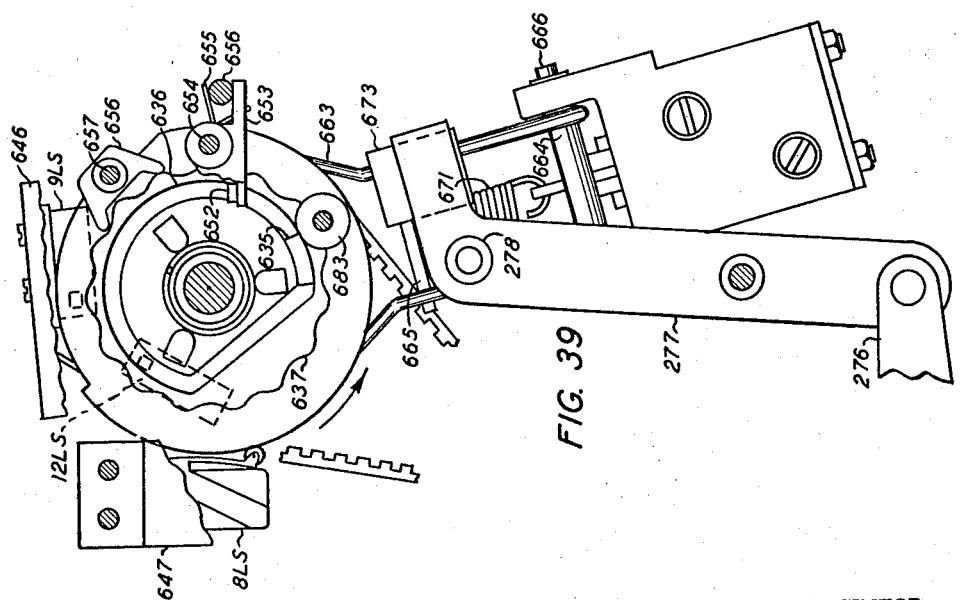
FIG. 39 is a sectional view taken along line 39—39 of FIG. 38.
Figure 40:
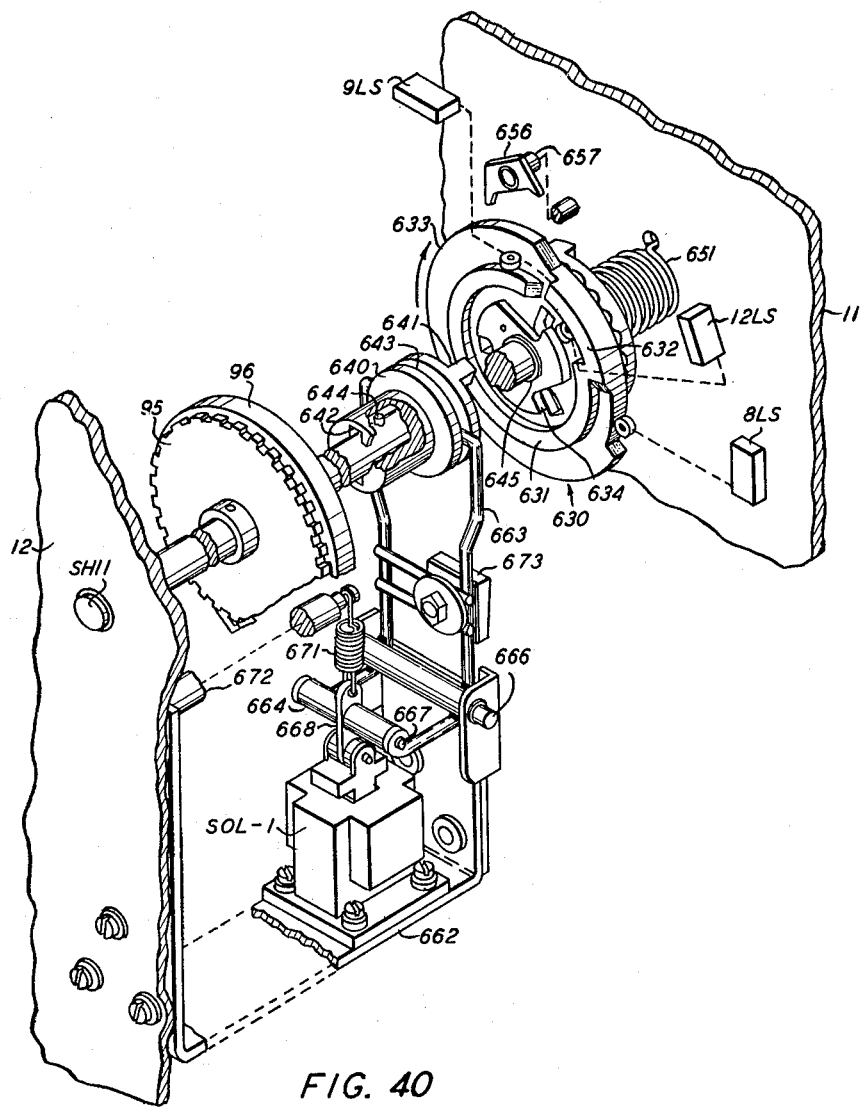
FIG. 40 is a right-hand perspective view of the time out cam assembly viewed from the back of the machine.

The rotation of the time out cam in a clockwise direction, as seen in FIGS. 10 and 39, is limited by engagement of the stop lug 635 extending axially from the billing counter cam 636 also formed on the time out cam, with the bumper 652 on the end of the cam stop lever 653. The cam stop lever is journaled on stub shaft 654 secured to frame plate 11 and is normally biased by spring 655 in a counterclockwise direction, as seen in the above figures, into contact with the stop pin 656 fixed to frame plate 11.

To retard the motion of the time out cam as it is rotated in a clockwise direction by the return spring, there is provided on the time out cam a toothed escapement wheel portion 637, the teeth of which cooperate with an oscillating member 656 pivotally supported on spindle 657. With this arrnagement, the inertia of the time out cam as it is returned to its home position, as determined by the engagement of the stop lug against the bumper, is partly absorbed by the oscillating member, and not entirely by the stop lug 635 as it strikes the bumper 652.

The latch mechanism used to prevent advancement of sheet transfer material during the timing out cycle of the machine and to effect operation of the time out cam includes a clutch lever bracket 661 fastened to a U-shaped bracket 662 secured to frame plate 12. A forked actuator lever which of two L-shaped levers 663 held in spaced relation to each other by spacer 664 and by rod 65, is pvotally mounted on pivot pin 666 positioned in the clutch lever bracket 661. As shown, spacer 664 encircles pivot pin 666.

The levers 663, at one end, engage the annular groove 643 in clutch slide 640, and at the other end are engaged by pivot 667 positioned in the link 668. Link 668 is connected at one end to the bifurcated plunger of the normally open, cam release solenoid SOL1 fastened to bracket 662.

Figure 38:
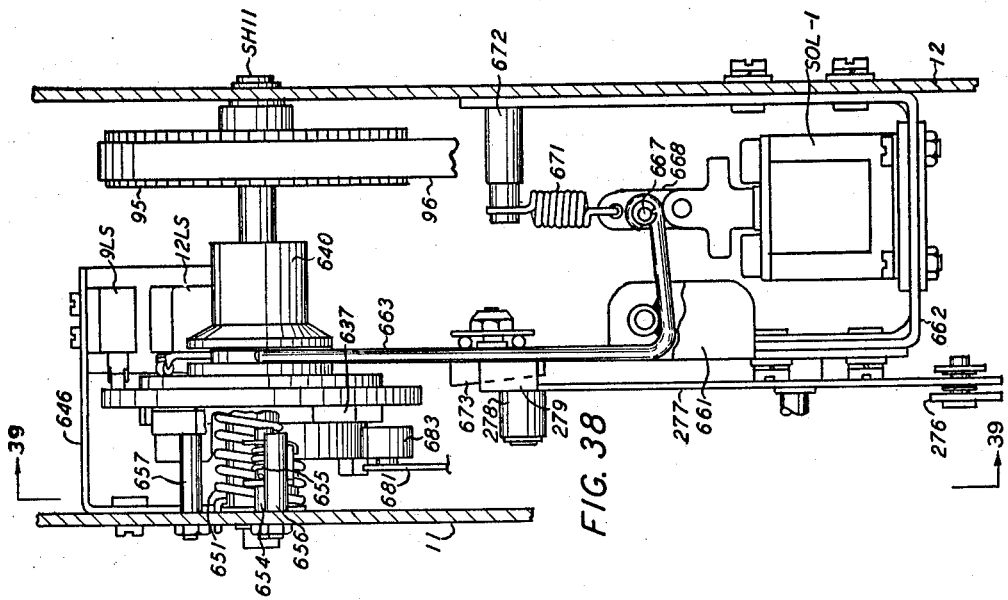
FIG. 38 is a front view of the time out cam and time out latch assembly.

At its other end, link 668 is provided with an opening to receive one end of spring 671, the opposite end of the spring being secured to spring pin 672 extending from a leg of bracket 662, whereby the levers are normally biased in a counterclockwise direction, as seen in FIG. 38, to force the clutch slide into engagement with the time out cam.

A latch 673 is fixed to the forked actuator lever in position to engage the latch portion 279 of cam lever 277 whereby when the cam release solenoid SOL1 is de-energized as shown in FIGS. 10, 38, and 39, the latch 673 engages the latch portion 279 of cam lever 277 to lock this lever in an inoperative position. When the cam lever 277 is in its inoperative position, the roller 278, thereon, is raised out of engagement with the roller control cam 281 on drum shaft SH1 thereby preventing the separator rollers 61 from being dropped into contact with the stack of support material in the paper tray. In this manner, although the separator rollers are rotated to advance a sheet during each rotative cycle of the xerographic drum, sheet material is not advanced as the xerographic drum is rotated during the timing out cycle of the machine.

To permit an operator to determine the number of reproductions made during a period of time, for example a day, there is provided a conventional mechanically actuated counter 674 mounted on bracket 675, secured to frame plate 11 at the rear of the machine, in position to be accessible to an operator.

Since the number of revolutions of the xerographic drum and the elements related thereto will vary, depending on the number of reproductions made, because of the two additional rotative cycles of the xerographic drum while the machine is timing out, it is apparent that a count of the number of revolutions made by the xerographic drum in a period of time would not be a true indication of the number of reproductions made during the period of time.

The only accurate indication of the number of reproductions made during a period of time, is the number of sheets of support material advanced into transfer contact with the drum in the specified period.

To count the number of sheets advanced, there is provided a lever mechanism to actuate the counter only during an actual feeding cycle or reproducing cycle, but not during the timing out cycle.

Figure 30:
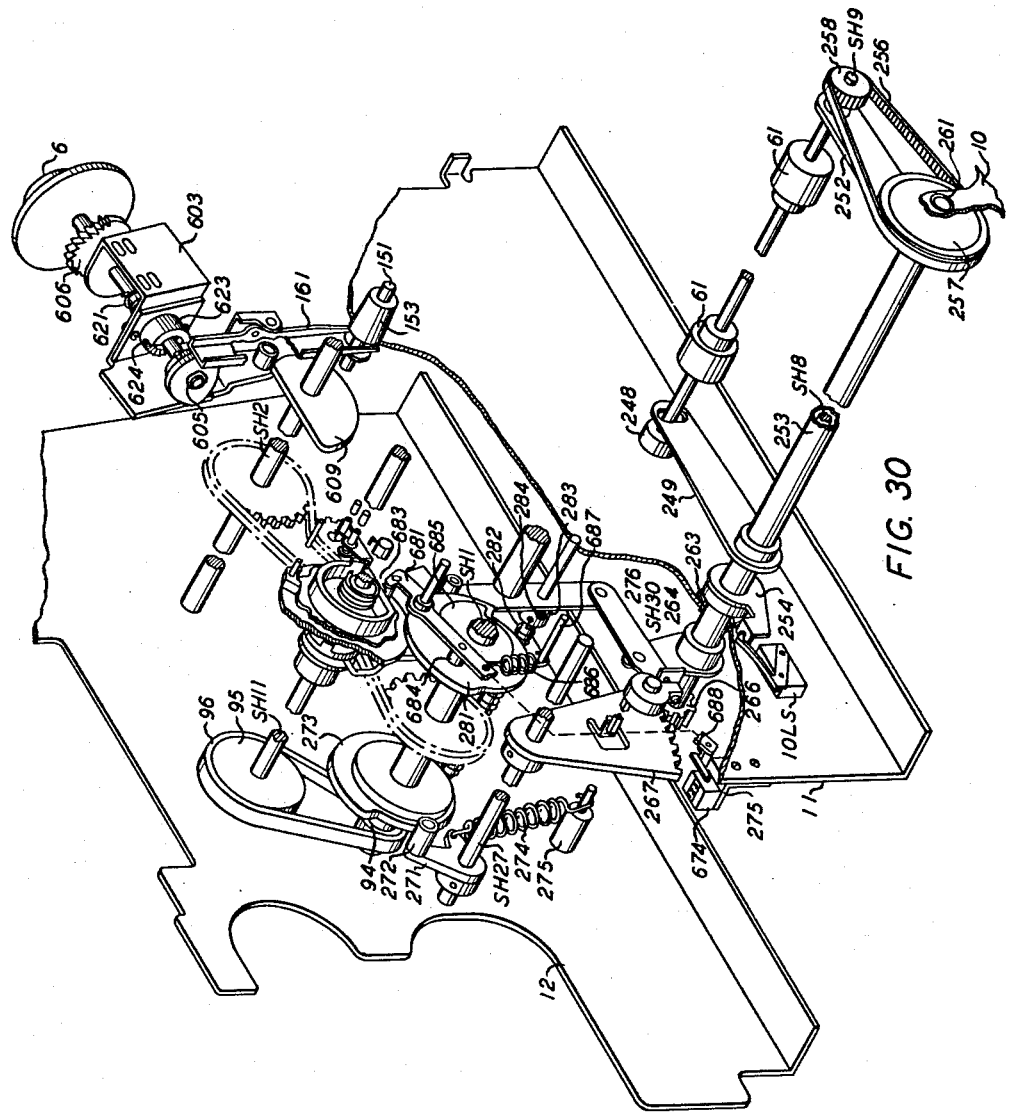
FIG. 30 is a left-hand perspective view of the mechanical control mechanism of the apparatus.

As shown in FIGS. 10 and 30, there is provided a counter lever 681 pivotally mounted on stub shaft 682 secured to frame plate 11.

A pair of cam followers 683 and 684 are journaled on the counter lever on the opposite side of its pivot axis, cam follower 683 being adapted to be actuated by billing counter cam 636 formed on time out cam 630 and cam follower 684 being adapted to be actuated by counter cam 685 fixed to the drum shaft SH1.

A spring 686 is connected at one end to the counter lever 681 and at its other end to a stud 687 extending from frame plate 11 to force the cam followers 683 and 684 toward their respective cooperating cams.

A drive pin 688, secured to the end of counter lever 681 opposite cam follower 683, is engaged in a suitable aperture in the actuating lever of the counter 674 whereby the counter is actuated as the counter lever is oscillated.

During a reproducing cycle, as a sheet is advanced by the paper feed mechanism previously described, the cam follower 684 by engagement with counter cam 685 will cause the counter lever to be rotated in a clockwise direction, as seen in FIG. 10, to actuate the counter. During the reproducing cycle, the time out cam 630, which has previously been released, is in its home position with the fall of the billing counter cam 363 adjacent the cam follower 683 on the counter lever.

When the time out cam is rotated during the timing out cycle, to the position shown in FIG. 10, the rise of the billing counter cam 636 will engage the cam follower 683 on the counter lever to raise cam follower 684 out of engagement with the counter cam 685 thereby preventing actuation of the counter during the period of time when the separator rollers are prevented from contacting the stack for advancing a sheet, as previously described.

As previously described, when the interposer pin 151 is in its operative position, as shown in FIG. 6, the rocker shaft 143 carrying the gripper fingers 142 is automatically actuated during each revolution of the copy drum so that a document retained by the gripper fingers is released for delivery from the machine and the gripper fingers remain open sufficiently long enough to receive a new or second document. This is the mode of operation when the machine is set to make a single reproduction of an original or when making successive reproductions from successive originals.

When making mutiple reproductions, of an original, it is desirable to retain the original on the copy drum during successive reproducing cycles, rather than requiring the operator to insert the original into the machine for each reproduction. To permit the document to be retained on the copy drum while making multiple reproductions, the interposer pin is moved out of operative relation with respect to the rocker shaft by an operator through the manupulation of control knob 6 of a programmer mechanism, constructed in accordance with the invention.

The programmer mechanism, in the preferred embodiment, 6, is secured to a control shaft 601 rotatably and slideably supported in a bracket 603 secured to the frame plate 11. The control knob is provided with a numbered scale so that the operator can dial the number of copies desired, for example, in the embodiment shown, the operator can set or program the machine to make one to ten copies from an original.

Fixed by means of pin 604 and retainer 605 to one end of the control shaft 601 is the interposer cam 602, which is used to effect operation of the interposer pin 151, the latter effecting operation of the gripper fingers on the copy drum 30 as previously described. The interposer cam 602 is positioned on the control shaft so that the rise of the cam is in position to actuate the actuator lever 161 when the control knob 6 is turned to make multiple copies, that is, when the control knob is set to make two to ten copies. With the interposer cam thus positioned on the control shaft, the fall of the cam is adjacent the actuator lever when the control knob is positioned to make single copies, that is, when number one on the dial is at the 12 o'clock position.

A ratchet 606 is fixed to the control shaft between the control knob and the front leg of bracket 603. A pawl plate 607 is loosely mounted on the control shaft between the ratchet 606 and a retaining ring 608 positioned in a suitable groove formed in the control shaft.

A step-by-step rotary motion is imparted to the ratchet by cam 609 fixed on shaft SH2 supporting the copy drum, this cam operating on a roller 611 carried by a lever 612. The lever 612 is pivotably journaled on the stud shaft 613 fixed to the rearwardly extending ear of the rear leg of bracket 603, and is provided with a drive pin 614 which is slideably received in the slotted end of pawl plate 607. A spring 615 is attached at one end to the lever, and its other end to a stud 616 fixed to frame plate 12, and the arrangement is such that the lever is rocked by the cam 609 in one direction during each revolution of the copy drum and the return movement of the lever in the opposite direction is produced by the spring 615. The pawl plate 607, which is pivoted concentrically with the ratchet 606, carries a spring 617 loaded drive pawl 618 which is adapted to engage the teeth of the ratchet 606 so that as the pawl plate is rocked it turns the ratchet with a step by step motion.

The pawl 618 on its return stroke strikes a pawl retract pin 619 and is thereby raised out of engagement with the ratchet. When the machine is at rest, the pawl is in position out of engagement with the ratchet whereby the operator may rotate the control knob 6 to set the machine to produce the number of copies desired.

Figure 35:
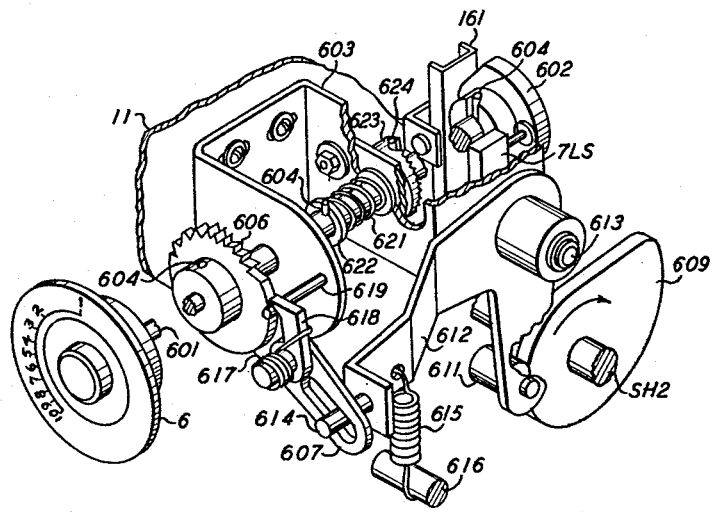
FIG. 35 is a right-hand perspective view of the programmer mechanism of the apparatus.

The control shaft 601 is normally biased to the front of the machine, to the left as seen in FIG. 35, by coil spring 621 encircling the control shaft. One end of the coil spring butts against the rear leg of the bracket 603 and the opposite end of the coil spring butts against a thrust washer 622 retained axially on the control shaft by pin 604.

A stop detent 623 is fixed to the rear leg of the bracket opposite the coil spring. The stop detent is provided with a large notched or detent portion defining a zero position and a series of angularly displaced small notches or detents, the latter numbering one less than the maximum number on the number scale on control knob 6. Thus in the embodiment shown, the stop detent is provided with nine small notches or detents. A detent pin 624 extends radially from the control shaft to cooperate with the stop detent, as described hereinafter.

The number of teeth on ratchet 606 is also one less than the highest number on the numbered scale on control knob 6. Thus, in the embodiment shown, wherein the control knob is calibrated with a number scale running from one through ten, the ratchet 606 is provided with nine teeth.

When it is desired to make more than one reproduction from an original, the mechanism is set by pushing inward on the control knob 6 and simultaneously rotating the control knob to indicate the number of reproductions desired. When the control knob is pushed in and rotated in a clockwise manner, as shown in FIG. 35, the detent pin 624 on the control shaft will be rotated to engage a small detent on the stop detent corresponding to the number dialed on the control knob minus one. The ratchet is also rotated upon rotation of the control shaft in corresponding relationship with the numbered scale on the control knob. At the same time the interposer cam 602 is rotated to actuate lever 161 to withdraw the interposed pin from its operative position and the interposer cam is moved to the rear out of engagement with multicopy limit switch 7LS mounted on bracket 603, for a purpose to be described.

As the machine is actuated, the copy drum will be rotated and during each revolution of the copy drum, the ratchet will be indexed one step, in a counterclockwise direction, as seen in FIG. 35. When the pawl engages the last tooth on the ratchet, it will rotate the control shaft sufficiently to allow the detent pin to ride off the shoulder on the stop detent to fall into the large detent or zero position thereon. When this occurs, the biasing action of the coiled spring will force the control shaft forward locking the detent pin 624 in the zero position on the stop detent 623 and causing the interposer cam to move into contact with the multi-copy limit switch 7LS.

Figure 36:
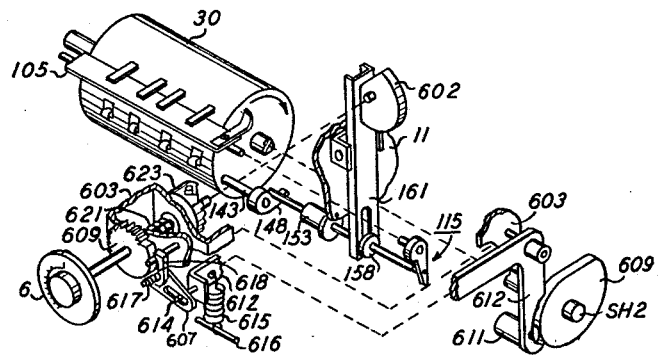
FIG. 36 is a right-hand perspective view of the programmer mechanism and document handling mechanism set for reproducing single copies.
Figure 37:
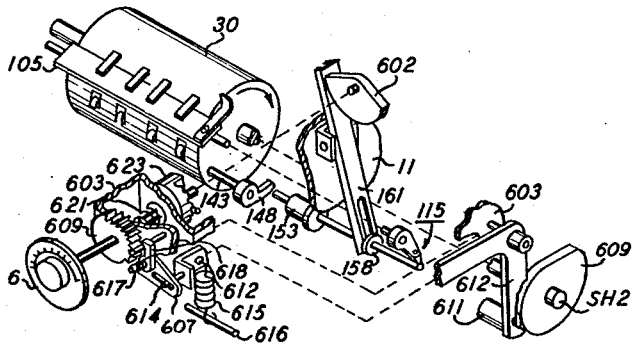
FIG. 37 is a right-hand perspective view of the programmer mechanism and document handling mechanism set for making multiple copies.

Referring to FIGS. 36 and 37, it is noted that when the interposer pin 151 is in its operative position with respect to the lever cam 148 on the rocker shaft 143, the latch stop 115, on shaft 101, carrying the document stops 107 and pressure fingers 106, will clear the end of the interposer pin 151 whereby the rocker shaft and elements attached thereto will operate in the manner previously described.

When the interposer pin 151 is moved out of operative relation to the rocker shaft, when making multiple reproductions, it is positioned in interference relation with the latch stop 115.

As a document is inserted into the machine, the elements on the shaft 101 will retain and guide the document as previously described, but as soon as the shaft 101 is rotated to release the document, the latch stop will be rotated sufficiently to engage the interposer pin, that is, it will move from the position shown in FIG. 14 to the position shown in FIGS. 18 and 37.

The latch stop 115 includes an arm 116 fixed to shaft 101. A spring 117 biased latch 118 is pivotally secured to the arm 116 whereby as the shaft 101 and therefore arm 116 is moved in a counterclockwise direction, as seen in FIG. 14, the latch 118 will be rocked about its pivot to ride past the interposer pin 151. Return movement of the shaft 101 and arm 116 in a clockwise direction is prevented by the latch 118 at one end striking the interposer pin, the opposite end of the latch striking an ear 119 on arm 116, whereby the document stops 107 and pressure fingers 106 are held out of interference relation with a document on the copy drum.

A clearer understanding of the operation of the apparatus can best be obtained by reference to the schematic wiring diagram and by reference back to the operating characteristics of the machine elements, as previously described.

Before the xerographic apparatus may be actuated, the removable panels of the cabinet enclosing the apparatus must be placed in closed position to actuate the interlock switches 1LS, 2LS and 4LS, mounted on the cabinet frame, not shown. These interlock switches are used, so that the machine may be operated only when the removable panels of the cabinet are in position. This provision is made, not only from the standpoint of safety, but also to ensure proper air circulation within the cabinet to dissipate heat generated by the projection lamps and the heat fuser. In addition, the paper tray and the developer apparatus must be positioned in operative relation to the other elements of the machine to close limit switches 3LS and 13LS, respectively.

The entire assembly of the apparatus is energized by closure of switch SW1 connecting the assembly through the limit switch 1LS, 2LS, 3LS and 4LS to a suitable source of power, such as a commercial 120 volt, 60 cycle alternating current outlet.

With the closure of switch SW1, the machine is placed in a stand-by condition as indicated by a stand-by lamp LMP1 which is energized through transformer T1. The resistance heating elements R1 and R2 of the heat fuser 70 are energized through the normally closed thermostat THS2. The machine is maintained in the stand-by condition for a period of time to permit the heat fuser to come up to its normal operating temperature. It is noted that motors MOT1 and MOT4 operating blowers, not shown, are connected in series with normally open thermostat THS1 directly across the line, whereby these motors may be energized upon a rise in temperature within the cabinet.

Referring now to FIG. 10, the physical relationship of the control components of the machine and of some of the electrical components involved in timing the machine are shown in the machine stand-by condition. As shown in FIG. 8, the drum pulse switch 5LS is actuated by the drum pulse cam 164 fastened to the copy drumshaft SH2. The drum pulse cam 164 is arranged on the shaft so that the drum pulse switch 5LS is open at the time the machine shuts down, therefore, this switch is open when the machine is in a stand-by condition. The drum pulse switch is, in fact, an interlock which permits the cam release solenoid SOL1 to be actuated when making successive copies as described hereinafter.

In the machine stand-by condition, the cam release solenoid SOL1 is de-energized thereby permitting the spring 671 to bias the levers 663 in position to maintain the clutch slide 640 in engagement with the time out cam 630, and to latch up the separator rollers 61 through the linkage previously described. In the stand-by condition, the time out cam 630 is in its extreme position rotatively as shown in FIG. 10.

The time out cam, when in this position, actuates the limit switches 8LS, 9LS and 12LS. When the limit switch 8LS is actuated by the time out cam, its normally open contact 8LS-A is closed, and its normally closed contact 8SL-B is opened. In this position, of the time out cam, the normally open contact 9LS-A of limit switch 9LS is closed, and the normally closed contact 9LS-B is open. Also the normally open contact 12LS-A of multi-copy delay limit switch 12LS is closed, and its normally closed contact 12LS-B is open.

As a document is inserted into the machine through the document guide, the document sensing switch 6LS is actuated to close its normally open contact. This switch through the contact 9LS-A of limit switch 9LS, which is closed in a stand-by position, the normally closed contact 11LS-B of end of web limit switch 11LS and closed contact 12LS-A permits the cam release solenoid SOL1 to be energized. As the cam release solenoid SOL1 is energized, it will, through the action of levers 663, pull the clutch slide 640 out of engagement with the time out cam 630 thereby permitting the time out cam to rotate back to its home position by the action of the return spring 651, as previously described.

As the time out cam returns to its home position, the respective cam surfaces thereof will ride off the actuators for limit switches 8LS, 9LS and 12LS. At this time, the main drive motor MOT3 is energized, through the now closed contact 9LS-B of limit switch 9LS, to rotate the xerographic drum 20, the copy drum 30 and the sheet conveyor mechanism 62. Fuser solenoid SOL2 is energized to open the gate of the heat fuser 70. The discharge lamp LMP6, a fluorescent lamp, is energized through its circuit consisting of ballast L5 and starter switch S3. Power is also supplied to the high voltage power supply PS1 to effect operation of the corona charging device 21, the corona transfer device 64 and the corona pre-cleaning device 84. With the opening of contact 9LS-A, the cam release solenoid SOL1 is de-energized.

At the same time, the wait-to-dial indicator lamp LMP11 is energized through the transformer T3, this lamp being used to indicate to the operator that the machine is now performing a processing cycle, so that the operator will not turn the control knob 6 at this time.

Within a very short period of time after the closure of contact 9LS-B, the contact 8LS-B of limit switch 8LS is closed to energize through closed limit switch 13LS the motor MOT2 to effect operation of the developing apparatus 50 and toner dispenser 54, and to energize transformer T2 whereby power is supplied to the fill-in lamps LMP4 and LMP5. At this time, the contact 8LS-A of limit switch 8LS is opened, allowing an over voltage from the secondary of transformer T2 to be added to the line supplying power to the fluorescent lamps LMP2 and LMP3 through the circuits consisting of ballasts L1, L2 and L3, L4, and starters S1 and S2, respectively. Prior to the opening of contact 8LS-A, during stand-by, with transformer T2 un-energized, normal line voltage is supplied to this fluorescent lamp circuit.

When the cam release solenoid SOL1 is energized to release the clutch slide 640, it will also unlatch the cam lever 277 whereby its rollers 278 will drop onto the surface of the paper feed cam 273.

The machine is now operating to effect a document reproducing cycle and to effect a paper feed cycle as determined by the paper feed mechanism as previously described.

When the time out cam rotates off the limit switch 12LS, the contact 12LS-A will be opened, which interrupts the line to cam release solenoid SOL1, previously de-energized by opening of contact 9LS-A.

When the cam release solenoid SOL1 was energized, it caused the release of the cam lever 277 thereby allowing the roller 278 thereon to engage paper feed cam 273. When the cam release solenoid SOL1 is de-energized upon the opening of contact 9LSA, the lever 663 of the latch mechanism will be biased by spring 671 in a counter-clockwise direction, as shown in FIG. 38, but its movement will be arrested by latch portion 279 of cam lever 277 contacting the face of latch 673. With the movement of lever 663 thus arrested, the clutch slide 640 will not have been moved sufficiently to the left, as shown in the above figure, to permit the lug 641 of the clutch slide to engage one of the slots 634 of time out cam 630.

It is noted that when making single reproductions of documents, the programmer mechanism is set to its zero position, that is, the numeral one on the control knob will be at the twelve o'clock position. As previously described, the normally closed limit switch 7LS is open when the programmer mechanism is at its zero position.

At the end of a paper feed cycle, the paper separator rolls are raised by the paper feed cam, and as the roller 278 rises on the paper feed cam 273 the latch portion 279 of cam lever 277 will ride off the face of latch 673 to be engaged by the latch. As the latch portion 279 rides off the face of latch 673, the levers 663 can be biased by spring 671 to their extreme counterclockwise position, whereby the clutch slide 640 will be shifted sufficiently to the left, to the position shown in FIG. 38, to engage the time out cam 630 for effecting rotation of the time out cam. The engagement or latching up of the cam lever 277 prevents the paper feed system from feeding additional sheets.

After approximately 300° of rotation of the xerographic drum from the time at which the clutch slide became engaged with the time out cam, the time out cam will have rotated sufficiently to again actuate the limit switches 12LS and then 8LS. This causes the contact 8LS–B of limit switch 8LS to open to thereby de-energize the developer drive motor MOT2, transformer T2 and lamps LMP4 and LMP5. Normal line voltage is now supplied to the fluorescent lamp circuit consisting of lamps LMP2 and LMP3 and their associated ballasts and starters.

Upon continued rotation of the time out cam 630, the time out cam when it reaches its stand-by position, as shown in FIG. 10, will actuate limit switch 9LS, causing its contact 9LS–B to open, thereby de-energizing the main drive motor MOT3 and associated elements. The machine is once again in a stand-by position and a reproducing cycle can be initiated again merely by inserting a document into the document guide to close the document sensing switch 6LS whereupon the cam release solenoid SOL1 will again be energized to initiate another reproducing cycle.

The operation of the machine, while making a reproduction of successive documents fed into the machine, will now be described. The action of the machine upon the insertion of the first document is identical with that described previously. If another document, a second document, is inserted into the machine soon after the first document has been gripped on the copy drum for movement into the machine, the document sensing switch 6LS will be held in a closed position by the second document.

The machine will now go through the sequence of operation, described earlier, for one complete revolution of the xerographic drum. At the time the drum pulse switch 5LS is closed on the second cycle of rotation, the document sensing switch 6LS is still being held closed by the second document waiting to be received by the machine. Since the document sensing switch 6LS is closed, closure of the drum pulse switch 5LS will again energize the cam release solenoid SOL1, whereby the clutch slide 640 is disengaged from the time out cam 630 and the paper latch mechanism is disengaged to permit another paper feed cycle. Thus, at approximately 240° of rotation of the xerographic drum from the beginning of the first reproducing cycle, the paper feed arm is latched up, as previously described. At the same time, the time out cam 630 has begun its time out cycle and will have actuated switch 12LS closing the contact 12LS–A prior to the closing of the drum pulse switch 5LS. With the closing of the drum pulse switch 5LS, the continued closure of the document sensing switch 6LS and the re-closure of contact 12LS–A, the cam release solenoid SOL1 is energized to release the paper feed cam lever 277 and to release the time out cam 630 permitting the time out cam to rotate back to its home position.

The machine has now been reset and starts a completely new reproducing cycle. If no other documents are inserted into the machine, it will shut down as described earlier. If, at any time, during the shut down cycle another document is inserted into the machine, the document sensing switch 6LS will be closed by this document. The document will be retained in the document guide until gripped by the gripper fingers on the copy drum. The next time the drum pulsing switch 5LS closes, it will cause the machine to recycle, as previously described. The machine, therefore, will reset and begin a new reproducing cycle every time the drum pulsing switch 5LS closes, provided the document sensing switch 6LS is closed at the same time.

For making multiple reproductions of an original, the operator will preset the programmer control knob 6 to the desired number of copies before inserting the document into the machine. The action of turning the programmer control knob to any number from two to ten, inclusive, closes the multi-copy switch 7LS. The interposer pin 151 is also withdrawn to an inoperative position upon rotation of the programmer control knob 6, as previously described. The starting of the machine and the acceptance of the document is identical to that of a single document. The multi-copy switch 7LS, in effect, sets up a holding circuit for the cam release solenoid SOL1, whereby this solenoid remains energized for as many cycles as are necessary to reproduce the required number of reproductions. Keeping the cam release solenoid energized prevents the cam lever 277 from latching up as previously described, therefore allowing the paper feed system to feed a sheet of paper during each revolution of the xerographic drum. The cam release solenoid SOL1 also keeps the clutch slide 640 disengaged from the time out cam 630 thereby keeping the machine in continuous operation.

At approximately half a drum revolution before the end of the reproducing cycle at which the last required reproduction is being exposed, the programmer mechanism will be reset to its zero position as previously described, thereby opening the multi-copy limit switch 7LS and simultaneously allowing the interposer pin 151 to return to its normal operating position. This action readies the machine for shut down, by de-energizing the cam release solenoid SOL1 to permit timing out of the machine, and allowing the gripper fingers on the copy drum to open to reject the document from the machine. The machine now shuts down in the normal manner as previously described.

Included in the holding circuit with multi-copy limit switch 7LS is switch 12LS. The contact 12LS–B of this switch is closed during part of the machine operating cycle, and its primary function is to prevent the current in rush from the developer drive motor MOT2 and the fill-in lamp circuit, from going through the document sensing switch 6LS which has a relatively low current rating. The contact 12LS–A, which opens on the flyback of the time out cam prior to closing of drum pulse switch 5LS prevents the cam release solenoid SOL1 from becoming energized a second time by the closing of the drum pulse switch 5LS during the first cycle of rotation of the copy drum.

Included in the machine electrical circuit is a low paper supply limit switch 10LS which is positioned to be actuated or closed, by a paper switch arm 254 secured to torque tube 253, whereby this switch is closed when the supply of sheet material in the paper feed tray is depleted. When this limit switch is closed during machine operation, it will energize solenoid SOL3 of a conventional buzzer mechanism, not shown.

Also included in the electrical circuit is an end of web limit switch 11LS. This limit switch is positioned adjacent the take-up roll 83 of the web cleaner, whereby web material is advanced into contact with the xerographic drum to clean residual powder material remaining thereon, and will be wound on the take-up roll. As the web material is wound on the take-up roll 83, the effective diameter of the material on this roll will increase in direct ratio to a decrease in the amount of web material remaining on the supply roll. Thus, when the supply of web material on supply roll 83 is nearly depleted, the diameter of material on take-up roll 83 will have increased sufficiently whereby the web material will contact the actuator of limit switch 11LS. When this occurs the normally open contact 11LS–A will be closed to energize small indicator lamps LMP7, LMP8, LMP9 and LMP10, positioned in a group beneath an indicator panel, of glass or other suitable material, adjacent switch SW1, thus indicating to the operator that he should replenish the supply of web material in the machine. These indicator lamps can only be energized when the machine is in the stand-by condition, since the contact 11LS–A of limit switch 11LS is in series with the contact 9LS–A of limit switch 9LS which is only closed when the machine is in the stand-by condition. When contact 11LS–A is closed, as previously described, the normally closed contact 11LS–B is opened thereby preventing the machine from being actuated again until the supply of web material is replenished.

While the invention has been described with reference to the structure disclosed herein, it is not confined to the details set forth, and this application is intended to cover such modifications or changes as may come with the purpose or the scope of the following claims.

What is claimed is:

1. In a xerographic reproducing apparatus having a xerographic drum and a copy drum journaled for rotation, a sheet gripper means carried by said copy drum, said sheet gripper means being adapted to cooperate with said drum to engage a document to be reproduced, an interposer means positioned adjacent said copy drum for movement into a first position to effect operation of said sheet gripper means and to a second position in which it is in an inoperative relation to said sheet gripper means, drive means connected to said xerographic drum and said copy drum to effect synchronized movement of said xerographic drum and said copy drum, clutch operated control means connected to said drive means to effect operation of said xerographic drum through at least one revolution to first effect a reproducing cycle and then through at least a second revolution to effect a timing out cycle;

the improvement comprising programmer means for effecting operation of said clutch operated control means and for moving said interposer means when a predetermined number of reproductions have been made, said programmer means including a support, a spring loaded shaft journaled in said support for both rotational and axial movement therein, a cam secured to said spring loaded shaft and operatively connected to said interposer means and to said clutch operated control means, a projection on said shaft, detent means encircling said spring loaded shaft and connected to said support for engagement with said projection, said detent means having an enlarged notch thereon to allow said spring loaded shaft to move into a released position when said projection is in line with said enlarged notch, a ratchet wheel fixed on said shaft and mounted concentrically with said detent means, means for imparting a step-by-step rotation to said ratchet wheel from the drive means, and hand controlled means fixed to said spring loaded shaft for rotating said spring loaded shaft to vary the position of said projection angularly with respect to said detent means so as to vary the number of reproducing cycles affected before said clutch operated control means is actuated to effect a timing out cycle and before said interposer means is positioned in operative relation with said sheet gripper means.

2. In a xerographic reproducing apparatus having a xerographic drum and a copy drum journaled for rotation, a sheet gripper means carried by said copy drum, said sheet gripper means being adapted to cooperate with said drum to engage a document to be reproduced, an interposer means positioned adjacent said copy drum for movement into a first position to effect operation of said sheet gripper means and to a second position in which it is in an inoperative relation to said sheet gripper means, drive means connected to said xerographic drum and said copy drum to effect synchronized movement of said xerographic drum and said copy drum, clutch operated control means connected to said drive means to effect operation of said xerographic drum through at least one revolution to first effect a reproducing cycle and then through at least a second revolution to effect a timing out cycle;

the improvement comprising programmer means for effecting operation of said clutch operated control means and for moving said interposer means when a predetermined number of reproductions have been made, said programmer means including a support, a spring loaded shaft journaled in said support for both rotational and axial movement therein, a cam secured to said spring loaded shaft and operatively connected to said interposer means and to said clutch operated control means, a projection on said shaft, detent means encircling said spring loaded shaft and connected to said support for engagement with said projection, said detent means having an enlarged notch thereon to allow said spring loaded shaft to move into a released position when said projection is in line with said enlarged notch, and a predetermined number of smaller notches, a ratchet wheel fixed on said shaft and mounted concentrically with said detent means, said ratchet wheel having teeth thereon equal to the number of said smaller notches on said detent means, means for imparting a step-by-step rotation to said ratchet wheel from the drive means, and hand controlled means fixed to said spring loaded shaft for rotating said spring loaded shaft to vary the position of said projection angularly with respect to said detent means so as to vary the number of reproducing cycles affected before said clutch operated control means is actuated to effect a timing out cycle and before said interposer means is positioned in operative relation with said sheet gripper means.

3. In a xerographic reproducing apparatus having a xerographic drum and a copy drum journaled for rotation, a sheet gripper means carried by said copy drum, said sheet gripper means being adapted to cooperate with said drum to engage a document to be reproduced, an interposer means positioned adjacent said copy drum for movement into a first position to effect operation of said sheet gripper means and to a second position in which it is in an inoperative relation to said sheet gripper means, drive means connected to said xerographic drum and said copy drum to effect synchronized movement of said xerographic drum and said copy drum, clutch operated control means connected to said drive means to effect operation of said xerographic drum through at least one revolution to first effect a reproducing cycle and then through at least a second revolution to effect a timing out cycle;

the improvement comprising programmer means for effecting operation of said clutch operated control means and for moving said interposer means to effect continued operation of said xerographic reproducing apparatus to make a predetermined number of reproductions, said programmer means including a support, a spring loaded shaft journaled in said support for both rotational and axial movement therein, a projection on said shaft, detent means encircling said spring loaded shaft and connected to said support for engagement with said projection, said detent means having an enlarged notch thereon to allow said spring loaded shaft to move into a released position when said projection is in line with said enlarged notch, a cam secured to said spring loaded shaft and operatively connected to said clutch operated control means, said cam being positioned on said shaft in angular relation with said projection whereby as said projection is in alignment with said enlarged notch said cam is positioned to effect movement of said interposer means to said first position, a ratchet wheel fixed on said shaft and mounted concentrically with said detent means, means for imparting a step-by-step rotation to said ratchet wheel from the drive means to thereby rotate said spring loaded shaft to align said projection with said enlarged notch, and hand controlled means fixed to said spring loaded shaft for rotating said spring loaded shaft to vary the position of said projection angularly with respect to said detent means thereby rotating said cam to move said interposer means to said second position and for moving said spring loaded shaft and said cam to control the operation of said clutch operated control means whereby the number of reproducing cycles affected before said clutch operated control means is actuated to effect a timing out cycle and before said interposer means is positioned in operative relation with said sheet gripper means can be varied.

4. In a xerographic reproducing apparatus having a xerographic drum and a copy drum journaled for rotation, a sheet gripper means carried by said copy drum, said sheet gripper means being adapted to cooperate with said drum to engage a document to be reproduced, an interposer means positioned adjacent said copy drum for movement into a first position to effect operation of said sheet gripper means and to a second position in which it is in an inoperative relation to said sheet gripper means, drive means connected to said xerographic drum and said copy drum to effect synchronized movement of said xerographic drum and said copy drum, clutch operated control means connected to said drive means to effect operation of said xerographic drum through at least one revolution to first effect a reproducing cycle and then through at least a second revolution to effect a timing out cycle;

the improvement comprising programmer means for effecting operation of said clutch operated control means and for moving said interposer means when a predetermined number of reproductions have been made, said programmer means including a support, a shaft journaled in said support for both rotational and axial movement therein, a cam secured to said shaft and operatively connected to said interposer means and to said clutch operated control means, a projection on said shaft, detent means encircling said shaft and connected to said support for engagement with said projection, said detent means having an enlarged notch thereon to allow said shaft to move into a released position when said projection is in line with said enlarged notch, and a predetermined number of smaller notches, a spring connected to said shaft for biasing said shaft axially to force said projection into contact with said detent means, a ratchet wheel fixed on said shaft and mounted concentrically with said detent means, said ratchet wheel having teeth thereon equal to the number of said smaller notches on said detent means, means for imparting a step-by-step rotation to said ratchet wheel from the drive means, and hand controlled means fixed to said shaft for rotating said shaft to permit rotation and axial movement of said shaft to vary the position of said projection angularly with respect to said detent means so as to control the number of reproducing cycles affected before said clutch operated control means is actuated by said cam to effect a timing out cycle and before said interposer means is positioned by said cam in operative relation with said sheet gripper means.

References Cited in the file of this patent
UNITED STATES PATENTS

| | | |
|---|---|---|
| 1,916,966 | Cunningham | July 4, 1933 |
| 2,959,095 | Magnusson | Nov. 8, 1960 |
| 3,015,304 | Carlson et al. | Jan. 2, 1962 |
| 3,053,962 | Cerasani et al. | Sept. 11, 1962 |